US012466329B2

(12) United States Patent
Rodgers

(10) Patent No.: US 12,466,329 B2
(45) Date of Patent: Nov. 11, 2025

(54) MODULAR SECUREMENT DEVICE

(71) Applicant: Stephen Rodgers, Tarpon Springs, FL (US)

(72) Inventor: Stephen Rodgers, Tarpon Springs, FL (US)

( * ) Notice: Subject to any disclaimer, the term of this patent is extended or adjusted under 35 U.S.C. 154(b) by 13 days.

(21) Appl. No.: 18/023,852

(22) PCT Filed: Aug. 10, 2021

(86) PCT No.: PCT/IB2021/057372
§ 371 (c)(1),
(2) Date: Feb. 28, 2023

(87) PCT Pub. No.: WO2022/064290
PCT Pub. Date: Mar. 31, 2022

(65) Prior Publication Data

US 2023/0311780 A1 Oct. 5, 2023

Related U.S. Application Data

(60) Provisional application No. 63/081,560, filed on Sep. 22, 2020.

(51) Int. Cl.
*B60R 9/06* (2006.01)
*B60R 9/10* (2006.01)
*B62H 3/08* (2006.01)

(52) U.S. Cl.
CPC .................. *B60R 9/10* (2013.01); *B60R 9/06* (2013.01); *B62H 3/08* (2013.01)

(58) Field of Classification Search
CPC ... B60R 9/10; B60R 9/06; B60R 9/048; Y10S 224/924; B62H 3/08
USPC .......................................................... 224/924
See application file for complete search history.

(56) References Cited

U.S. PATENT DOCUMENTS 5,025,932 A * 6/1991 Jay .......................... B60R 9/048 211/20
5,947,357 A * 9/1999 Surkin ...................... B60R 9/10 224/535
6,626,340 B1 * 9/2003 Burgess ................... B62H 3/00 224/570

* cited by examiner

*Primary Examiner* — Adam J Waggenspack
(74) *Attorney, Agent, or Firm* — PATENTFILE, LLC; Bradley C. Fach; Steven R. Kick

(57) ABSTRACT

A modular securement device may include a receiver coupler configured to be removably coupled to a vehicle hitch. A mounting plate may be coupled to the receiver coupler. A first slot may extend longitudinally along a top surface of the mounting plate, and a second slot may also extend longitudinally along the top surface of the mounting plate and may be spaced apart from the first slot. An optional support base may be moveably coupled to the mounting plate via engagement with the first or second slot. A crank receiver may be coupled to the support base. A lateral support may also be coupled to the support base, and a wheel support may be coupled to the lateral support.

19 Claims, 21 Drawing Sheets

MODULAR SECUREMENT DEVICE

CROSS REFERENCE TO RELATED APPLICATIONS

This application is a 35 U.S.C. 371 National Stage Entry of International Application No. PCT/IB2021/057372 filed on Aug. 10, 2021, which claims priority to and the benefit of the filing date of U.S. Provisional Application No. 63/081,560, filed on Sep. 22, 2020, entitled "Modular Securement Device", the entire disclosures of which are incorporated by reference herein.

FIELD OF THE INVENTION

This patent specification relates to the field of devices for securing one or more objects together. More specifically, this patent specification relates to a modular securement device which may be configured to secure bicycles and other objects to a vehicle hitch receiver or other portion of a vehicle.

BACKGROUND

Many people desire to transport sporting equipment, such as bicycles, using their vehicles. Due to limited storage space within a vehicle and/or the size of the equipment, many people use racks which may be secured to exterior locations on their vehicle. This is why it is especially common for people to transport bicycles via racks that have been developed for securing bicycles to hitch receivers on vehicles. However, existing receiver mounted bike racks suffer from non-modularity, requiring the entire rack to be installed onto the vehicle at one time. This causes very high weight, making it unmanageable for many people lacking the strength to install a rack onto a vehicle. Additionally, the rack cannot be stored inside the vehicle during non-use, due to its non-modularity and consequent size. Consequently, the rack must remain in the receiver, blocking access to the rear of the vehicle, or in storage at home, consuming garage space.

Another drawback of existing receiver mounted bike racks is that they require complex methods for attaching a bicycle to a rack and typically fall into a few categories for fixing a bike to a vehicle's receiver rack such as: fixing two wheels, frame, and other portions of the bike. For this reason, many people have difficulty securing and removing bicycles from the rack and the racks tend to be large and bulky in order to contact multiple points on the bicycles.

A further drawback of existing receiver mounted bike racks is that they frequently secure two or more bicycles in a manner that causes the bicycles to contact and suffer interference from each other. This contact and interference also makes securing and removing bicycles from these racks difficult and can even result in damage to the bicycles.

Therefore, a need exists for novel securement devices which may be used to secure bicycles and other objects to a vehicle hitch receiver or other portion of a vehicle. A further need exists for novel modular securement devices which allows for installation into the receiver, one or more components at a time, resulting in easier installation for all people, and the ability to have the rack on-hand, inside the vehicle during non-use. There is also a need for novel securement devices which provide a minimal method of bicycle attachment thereby reducing the number and size of components resulting in lighter weight and smaller size while accomplishing the same objective, a securely held bicycle onto a vehicle. Still a further need exists for novel securement devices which are able to hold two or more bicycles while preventing interference between the bicycles, such as between their pedals, cranks, handlebars, and seats.

BRIEF SUMMARY OF THE INVENTION

A modular securement device is provided which may be configured to secure bicycles and other objects to a vehicle hitch receiver or other portion of a vehicle. In some embodiments, the device may include a crank receiver having a crank cavity and a vertical groove configured to receive a crank arm of the bicycle, and the crank receiver may support all or substantially all of the weight of a bicycle. The device may further include a wheel support coupled to a lateral support, the lateral support configured to separate the wheel support a desired distance from the crank receiver, and the wheel support configured to immobilize a front tire of the bicycle that has its crank arm received in the crank receiver.

In further embodiments, the device may include a receiver coupler configured to be removably coupled to a vehicle, and a support base that may be coupled to the receiver coupler. A crank receiver may be coupled to the support base, the crank receiver may extend above the support base. The crank receiver may have a crank cavity and a vertical groove to receive a crank arm of the bicycle, and the crank receiver may support all or substantially all of the weight of a bicycle. A lateral support may be coupled to the support base, and a wheel support may be coupled to the lateral support. The lateral support may be configured to separate the wheel support a desired distance from the crank receiver, and the wheel support may be configured to immobilize a front tire of the bicycle that has its crank arm received in the crank receiver.

In further embodiments, the device may include a receiver coupler configured to be removably coupled to a vehicle, such as to a hitch of the vehicle. A mounting plate may be coupled to the receiver coupler. A first slot may extend longitudinally along a top surface of the mounting plate, and a second slot may also extend longitudinally along the top surface of the mounting plate and may be spaced apart from the first slot. A support base may be moveably coupled to the mounting plate via engagement with the first or second slot.

In further embodiments, the device may include a receiver coupler configured to be removably coupled to a vehicle, such as to a hitch of a vehicle. A mounting plate may be coupled to the receiver coupler, and a crank receiver may be coupled to the mounting plate, optionally via a support base. The crank receiver may extend above the support base, and the crank receiver may have a crank cavity and a vertical groove to receive a crank arm of a bicycle. Preferably, the crank receiver may support all or substantially all of the weight of a bicycle. A lateral support may be coupled to the crank receiver optionally via the support base, and a wheel support may be coupled to the lateral support. The lateral support may be configured to separate the wheel support a desired distance from the crank receiver, and the wheel support may be configured to immobilize a front tire of the bicycle that has its crank arm received in the crank receiver.

In further embodiments, the top surface of the mounting plate may include one or more mounting surfaces, such as a first, second, third, and fourth mounting surfaces, and one or more of the mounting surfaces may be level and/or may be sloped downwardly away from a central longitudinal axis.

In further embodiments, the receiver coupler and mounting plate may be removably coupled and/or movably coupled together.

In further embodiments, the device may include one securement device for removably coupling the portions of the bicycle crank/frame to the crank receiver.

In further embodiments, the device may include—another securement device for removably coupling the portions of the bicycle tire/wheel to the wheel support.

Numerous objects, features and advantages of the present invention will be readily apparent to those of ordinary skill in the art. Some example objects of the present invention are listed below.

One object of the present invention is to provide a device capable of supporting all or almost all of the weight of a bicycle by its longitudinal center of gravity, with a wheel support serving to prevent bicycle vertical rotation and prevent lateral wheel and handlebar rotation. This allows for the reduction in components and weight because of the limited number of components that are weight bearing, whereas all other existing bicycle racks require lateral weight bearing structures, adding material and weight.

Another object is to provide a device having the novel aspects of separating the receiver coupler from the rest of the elements of the device, thereby providing a modular mount, fixing to a mounting plate by a single mounting location.

Another object is to provide a device having the novel aspects of being the only known device capable of connecting the bicycle support elements to a mounting plate using a single mounting location provided by a support base.

Another object is to provide a device having the novel aspects of being the first modular securement device, allowing for reduction in size for storage and installation by modules, allowing for up to an 80% weight reduction during installation and removal.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
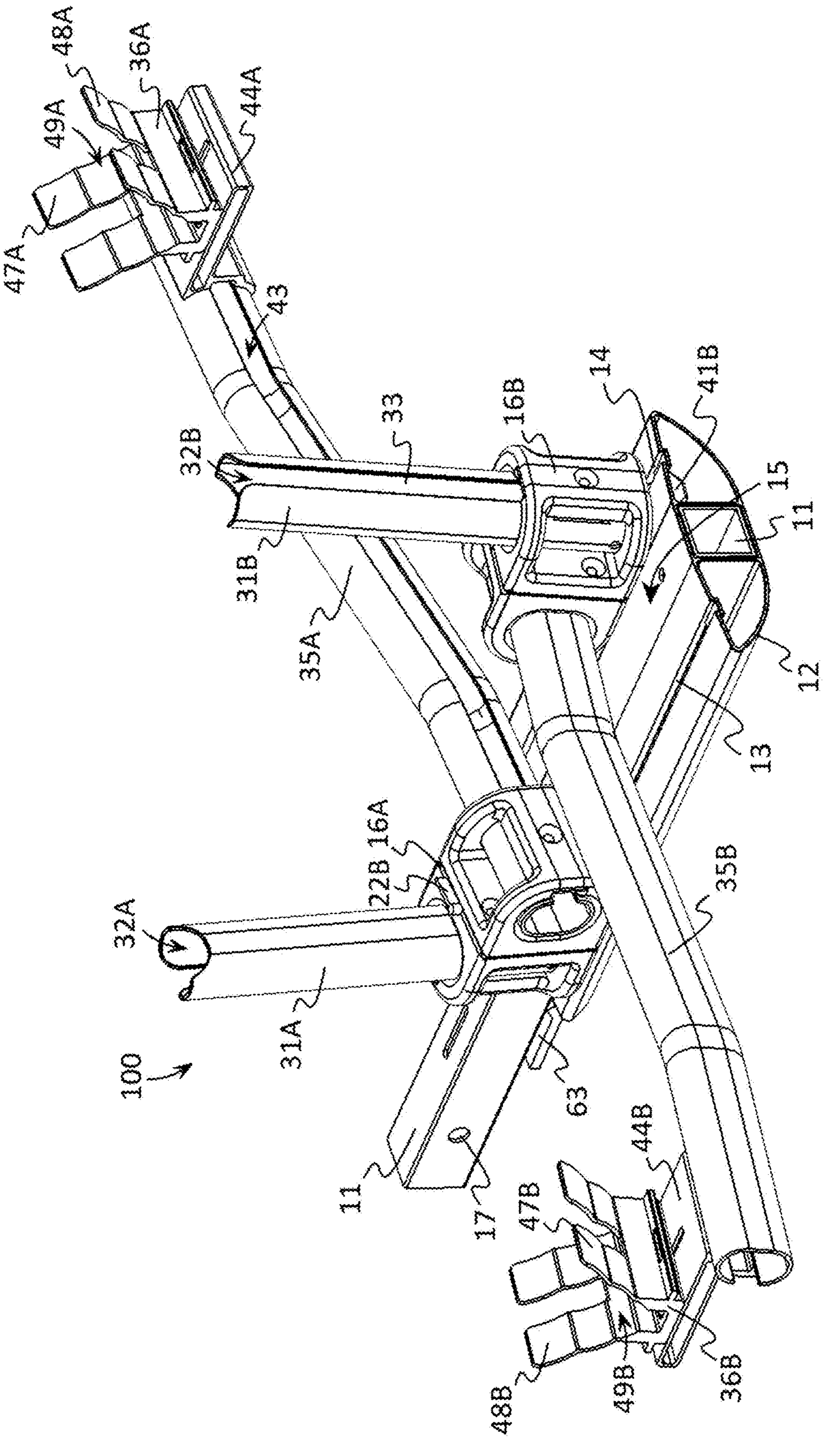
FIG. 1 depicts a top perspective view of an example of a modular securement device according to various embodiments described herein.
Figure 2:
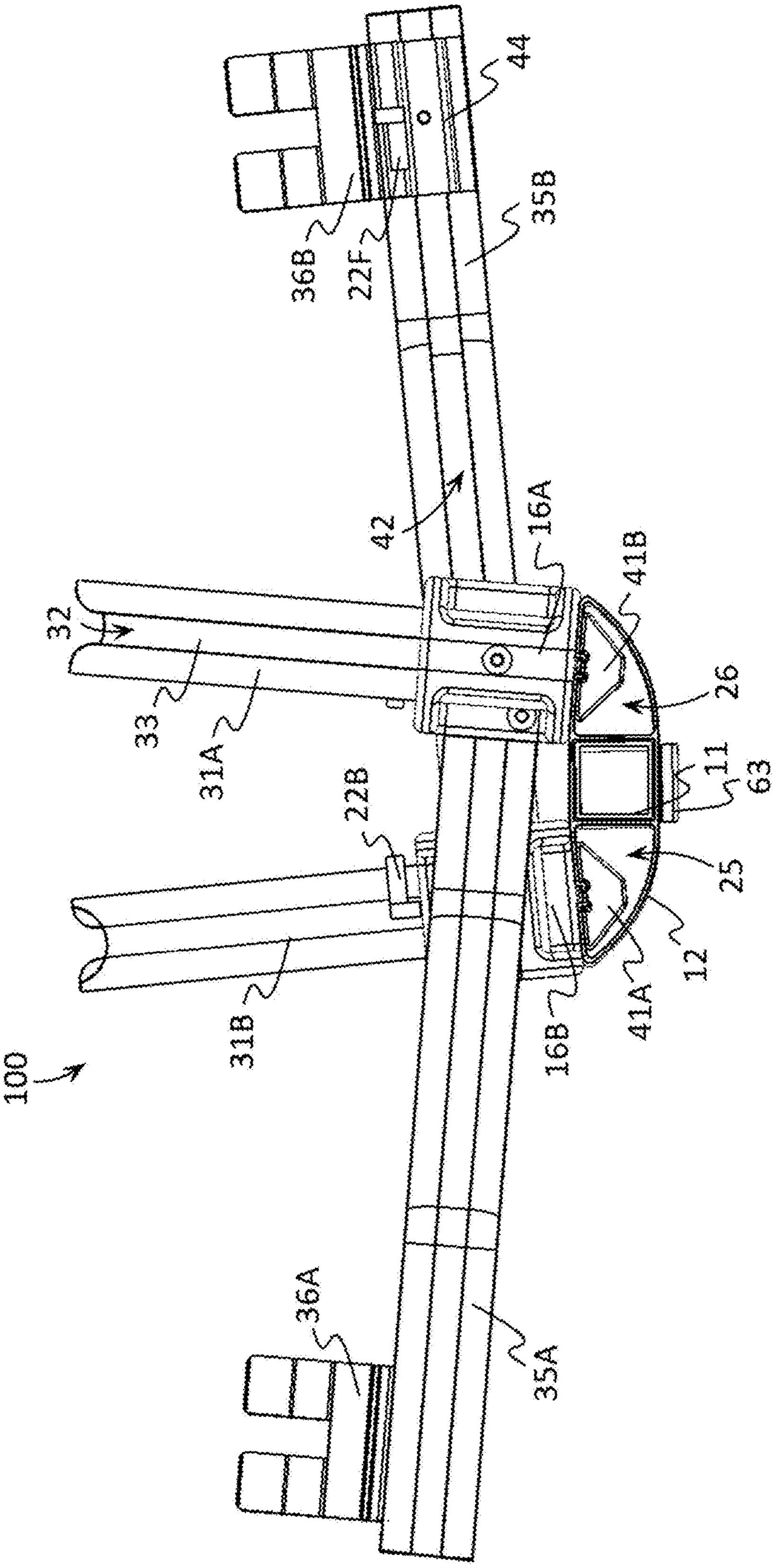
FIG. 2 illustrates a front elevation view of an example of a modular securement device according to various embodiments described herein.

For purposes of description herein, the terms "upper," "lower," "left," "right," "rear," "front," "side," "vertical," "horizontal," and derivatives thereof shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

As used in this application, the term "substantially parallel" refers to a range of values within plus or minus 2.0 degrees of absolute parallel (lines, planes, surfaces, or objects side by side and having the same distance continuously between them e.g., parallel lines never meet).

A new modular securement device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1-5, 8, 9, and 11-15 illustrate examples of a modular securement device ("the device") 100 according to various embodiments. In some embodiments, the device 100 may comprise a receiver coupler 11 configured to be removably coupled to a vehicle, such as to a hitch 201 of the vehicle 200. A mounting plate 12 may be coupled to the receiver coupler 11. A first slot 13 may extend longitudinally along a top surface 15 of the mounting plate 12, and a second slot 14 may extend longitudinally along the top surface 15 of the mounting plate 12 and spaced apart from the first slot 13. A support base 16, 16A, 16B, may be moveably coupled at a plurality of locations on the mounting plate 12 via engagement with desired location or portions of the first 13 or second 14 slot.

Figure 8:
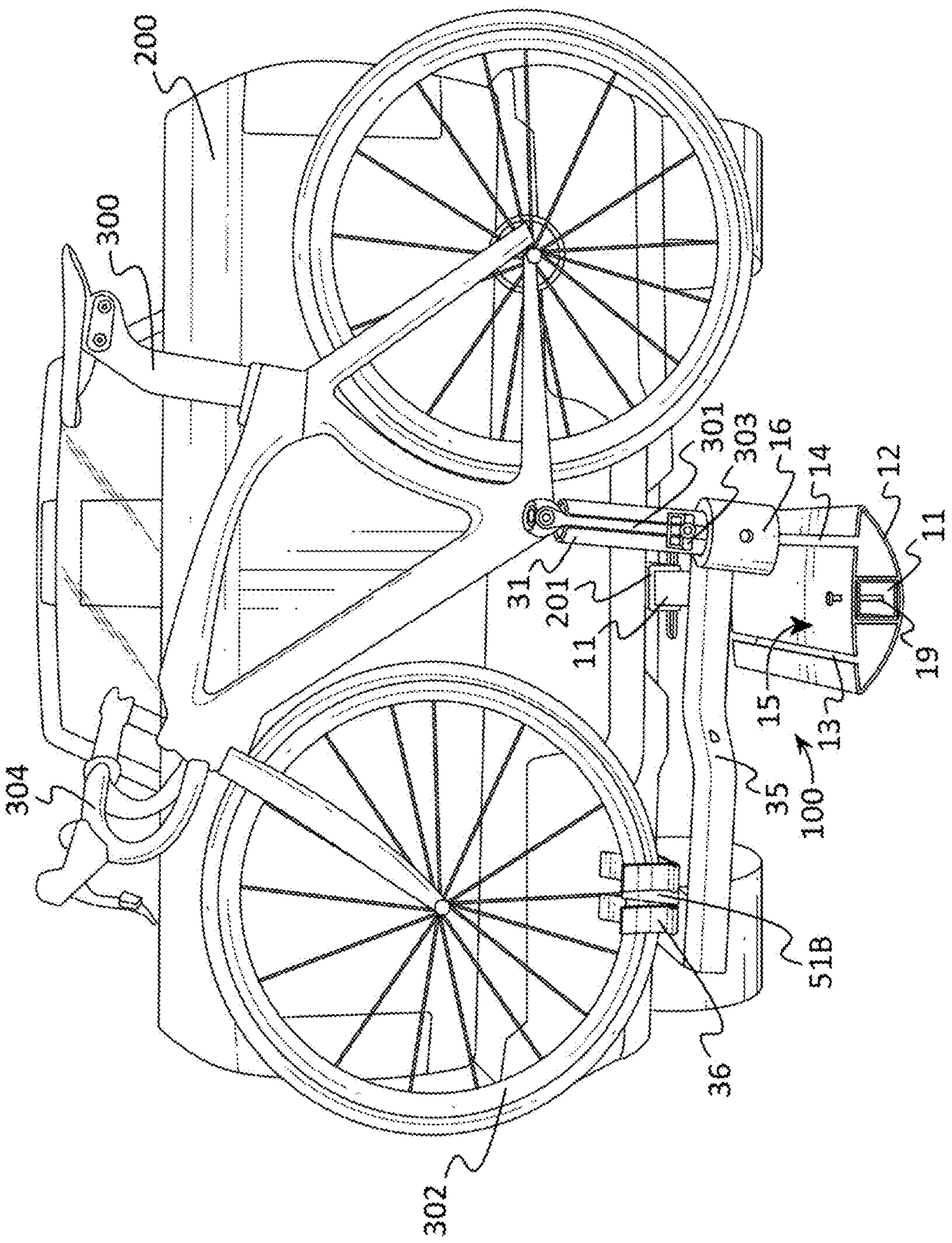
FIG. 8 illustrates a perspective view of an example modular securement device, supporting an example bicycle, that is coupled to an exemplary vehicle according to various embodiments described herein.

In further embodiments, the device 100 may include a crank receiver 31, 31A, 31B, which may be coupled to the mounting plate 12, optionally via a support base 16, 16A, 16B. In some embodiments, a mounting plate 12 and crank receiver 31, 31A, 31B, may be removably coupled together, optionally via a support base 16, 16A, 16B. In further embodiments, a mounting plate 12 and crank receiver 31, 31A, 31B, may be movably coupled together, optionally via a support base 16, 16A, 16B, so that the crank receiver 31, 31A, 31B, and optional support base 16, 16A, 16B may be repositionable relative to the mounting plate 12. The crank receiver 31, 31A, 31B, may extend above the mounting plate 12 and an optional support base 16, 16A, 16B, and the crank receiver 31, 31A, 31B, may be configured with a crank cavity 32, 32A, 32*n*, and a vertical groove 33 to receive portions of a crank arm 301 of a bicycle 300. The crank receiver 31, 31A, 31B, may support all or substantially all of the weight of a bicycle 300. A lateral support 35, 35A, 35B, may also be coupled to the crank receiver 31, 31A, 31B, optionally via the support base 16, 16A, 16B, and a wheel support 36, 36A, 36B, may be coupled to the lateral support 35, 35A, 35B. The lateral support 35, 35A, 35B, may be configured to separate the wheel support 36, 36A, 36B, a desired distance from the crank receiver 31, 31A, 31B, and the wheel support 36, 36A, 36B, may be configured to immobilize a front tire 302 of a bicycle 300 that has portions of one of its crank arms 301 received in a crank receiver 31, 31A, 31B. Preferably, a securement device 51A, 51B, may be coupled to a wheel support 36, 36A, 36*n*, and a front tire 302 to securely hold the front tire 302 to wheel support 36, 36A, 36*n*, as shown in FIG. 8.

A receiver coupler 11 may be configured to be removably coupled to a hitch 201 on a vehicle 200 and optionally other objects preferably by inserting portions of the receiver coupler 11 into the hitch/objects. In some embodiments, all or one or more portions of the receiver coupler 11 may comprise a generally rectangular prism shape which may allow portions of the receiver coupler 11 to be inserted and engaged with a hitch 201 that may include: Class I and II hitches (typically having a 1¼" square receiver opening), Class III and IV hitches (typically having a 2" square receiver opening), Class V hitches (typically having a 2½" square receiver opening), or any other type of hitch 201. In preferred embodiments, a receiver coupler 11 may comprise a first end 20A, which may comprise a generally square or rectangular prism shape which may allow the first end 20A to be inserted and engaged with a Class I, II, III, IV, or other hitch 201 preferably having a square receiver opening, and a second end 20B, which may be coupled to a mounting plate 12, preferably in or through a coupler cavity 18. In further preferred embodiments, a receiver coupler 11 may comprise an elongated shape so that portions of the receiver coupler 11 may extend through longitudinally through the mounting plate 12. In other embodiments, a receiver coupler 11 may be configured in any shape and size, and a receiver coupler 11 may comprise or be coupled to a bracket, fastener, or other coupling method which may allow the receiver coupler 11 to be coupled to European style hitches, other styles of hitches, vehicle bumpers, vehicles frames, or any other portion of a vehicle. A receiver coupler 11 may be formed from or comprise steel, aluminum, any suitable metal alloy, or any other durable material.

Preferably, a receiver coupler 11 may comprise a hitch pin aperture 17 which may be configured to receive a hitch pin, lock, or other object which may be inserted through the hitch pin aperture 17 and portions of a hitch 201 or other object that the receiver coupler 11 is to be coupled to.

Figure 3:
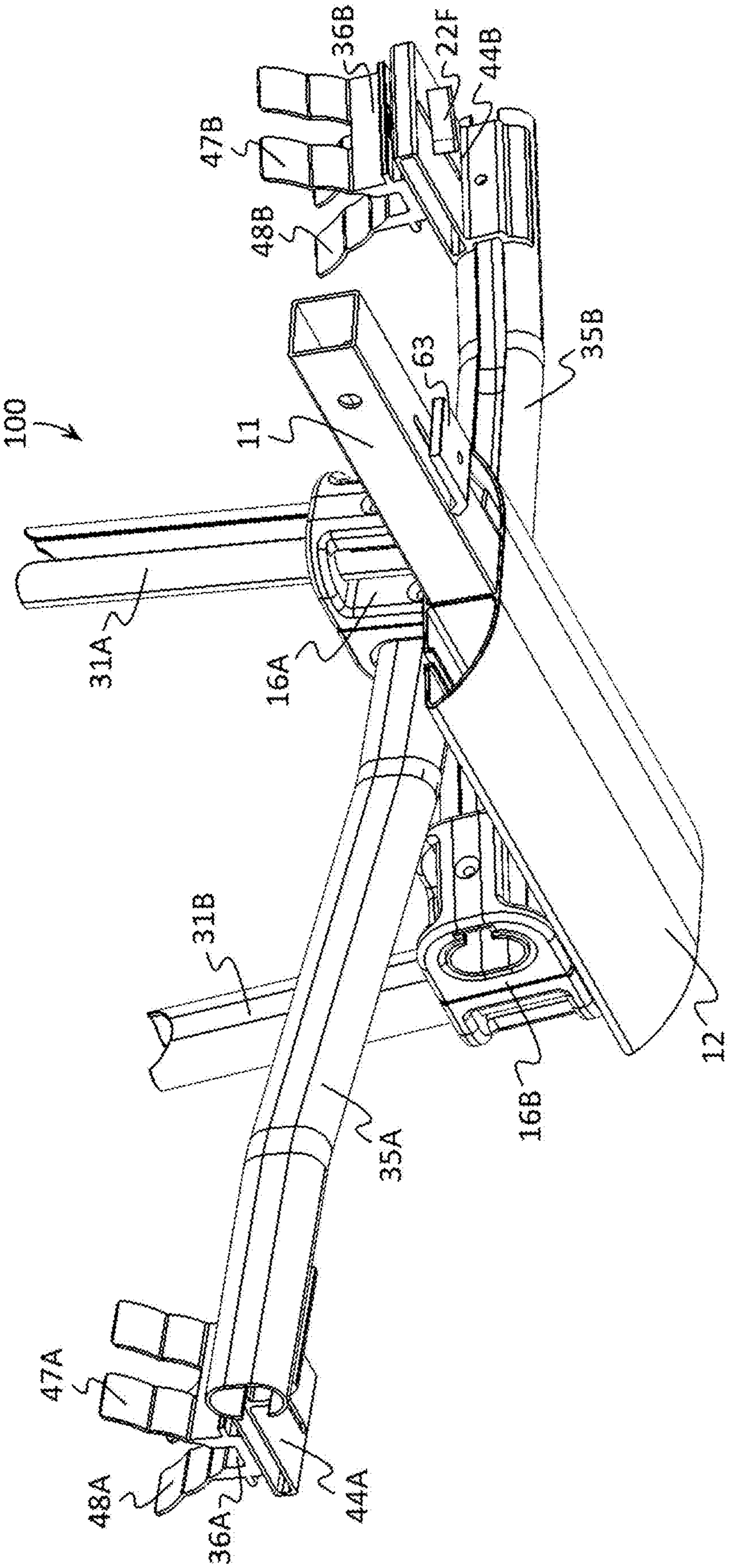
FIG. 3 shows a bottom, rear perspective view of an example of a modular securement device according to various embodiments described herein.
Figure 4:
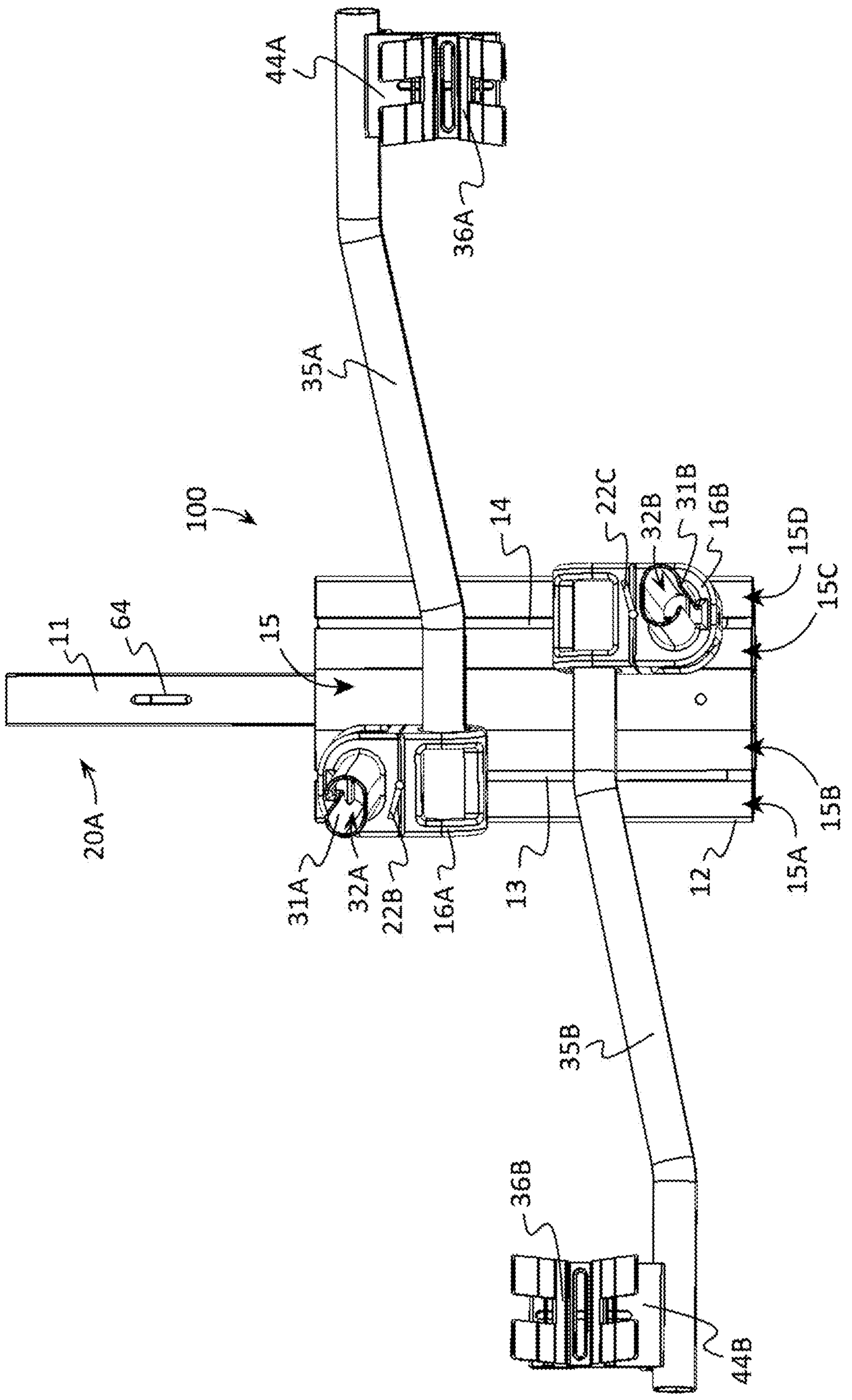
FIG. 4 depicts a top plan view of an example of a modular securement device according to various embodiments described herein.
Figure 5:
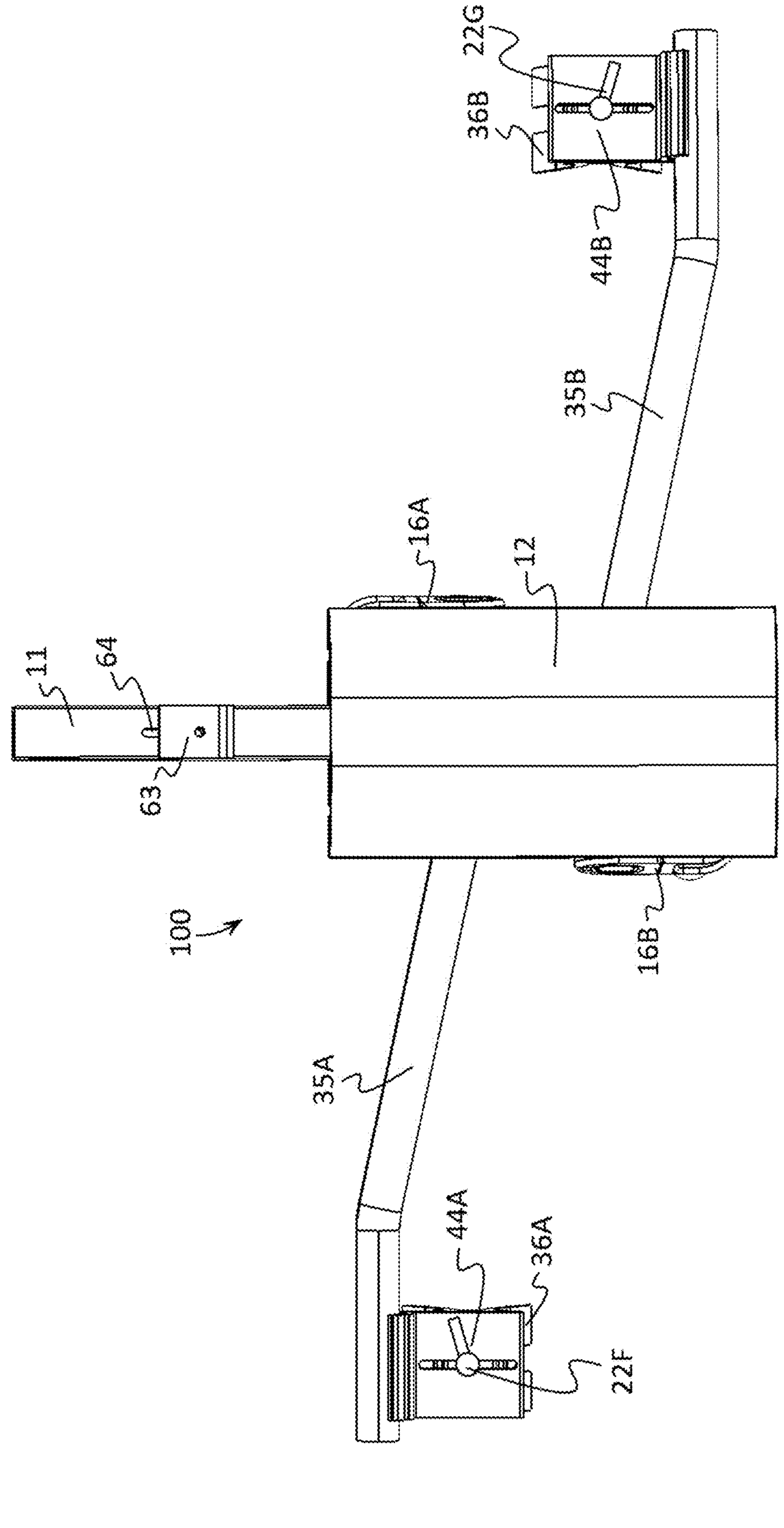
FIG. 5 illustrates a bottom plan view of an example of a modular securement device according to various embodiments described herein.
Figure 6:
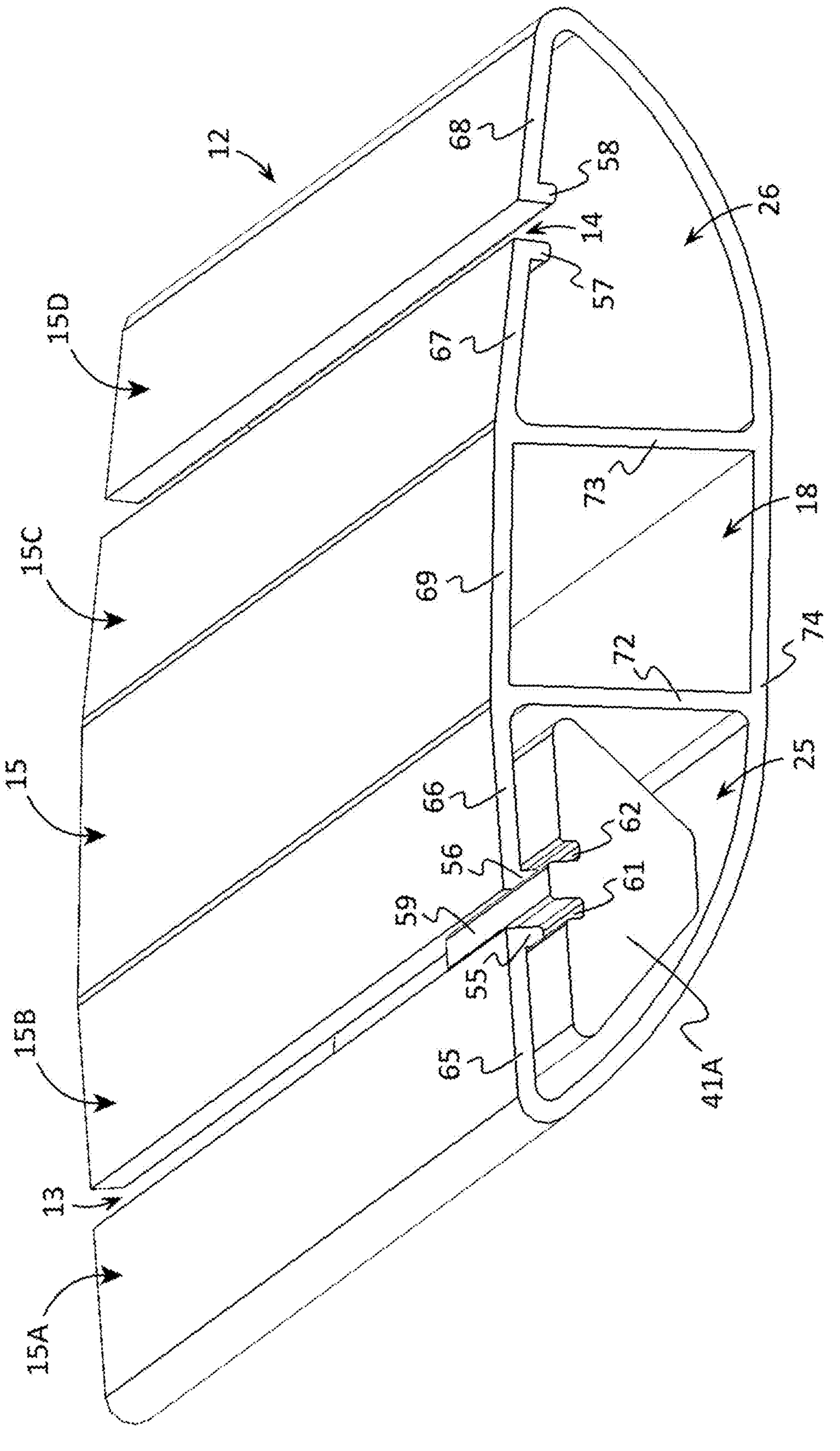
FIG. 6 shows a perspective view of an example of a mounting plate and lock plate according to various embodiments described herein.

In some embodiments, and as perhaps best shown in FIGS. 3 and 5, the device 100 may comprise an anti-rocking plate 63 which may be coupled to the receiver coupler 11. A bolt or other fastener may pass through the receiver coupler 11, and may adjust to the correct distance using receiver slot 64, then tightens anti-rocking plate 63 against the automobile hitch receiver to prevent rocking and other movements of the device 100 relative to the vehicle 200 that the device 100 is coupled to.

In some embodiments, the device 100 may comprise a locking pin 19 which may be inserted through a first pin aperture 21A formed in a mounting plate 12 and a second pin aperture 21B formed in a receiver coupler 11 when the receiver coupler 11 is positioned in a coupler cavity 18 to removably couple and position the receiver coupler 11 and mounting plate 12 together. Optionally, locking pin 19 may comprise threading that may engage with threading in the first 21A and/or second 21B pin aperture to removably couple and position the receiver coupler 11 and mounting plate 12 together.

In further embodiments, the device 100 may comprise a receiver cam lock 22A, a lock bar 23, and one or more clamping blocks 24 which may be engaged to the lock bar 23 and receiver cam lock 22A. The lock bar 23 may extend through the receiver coupler 11, and the clamping blocks 24 may be positioned on opposing ends of the lock bar 24 and receiver coupler 11. The receiver coupler 11 may comprise coupler clamping surfaces 28 on its opposing ends which may be clamped against a block clamping surface 27 by each clamping block 24. By engaging the receiver cam lock 22A, the block clamping surfaces 27 of the clamping blocks 24 may be tensioned against the coupler clamping surfaces 28 of the receiver coupler 11 and portions of the mounting plate 12 to tighten and further secure the positioning and coupling of the receiver coupler 11 to the mounting plate 12. In still further embodiments, any coupling method may be used to couple a receiver coupler 11 and mounting plate 12 together.

In still further embodiments, any suitable coupling method, device, etc., may be used to couple, and more preferably movably and/or removably couple a receiver coupler 11 and a mounting plate 12 together.

The device 100 may comprise one or more mounting plates 12 which may be coupled, and more preferably removably coupled, to a receiver coupler 11. In some embodiments, a mounting plate 12 may comprise a coupler cavity 18 which may be sized and shaped to receive portions of a receiver coupler 11. In preferred embodiments, a coupler cavity 18 may extend longitudinally through a mounting plate 12, and portions of the elongated body of the receiver coupler 11 may pass through the mounting plate 12 via the coupler cavity 18. A mounting plate 12 may be formed from or comprise aluminum, steel, any suitable metal alloy, or any other durable material.

In some embodiments, the mounting plate 12 may comprise a top surface 15 having a substantially planar or flat shape or contour. For example, a top surface 15 may comprise one or more mounting surfaces 15A, 15B, 15C, 15D, which may be planar in shape and which may be level with each other. In further embodiments, the top surface 15 may comprise one or more mounting surfaces 15A, 15B, 15C, 15D, that may each be planar in shape and that may be angled relative to at least one other mounting surface 15A, 15B, 15C, 15D. By coupling a support base 16, 16A, 16B, to one or more mounting surfaces 15A, 15B, 15C, 15D, of a mounting plate 12, the angle of the one or more mounting surfaces 15A, 15B, 15C, 15D, may be imparted to the support base 16, 16A, 16B, and also imparted to elements coupled to the support base 16, 16A, 16B, and therefore imparted to a bicycle 300 coupled thereto. In some embodiments, the mounting plate 12 may comprise a first plate wall 65, second plate wall 66, third plate wall 67, and a fourth plate wall 68, and each plate wall 65, 66, 67, 68, may form a mounting surface 15A, 15B, 15C, 15D. Optionally, the mounting plate 12 may comprise a central wall 69 and one or more support walls 72, 73, which may be coupled to a base wall 74, and the central wall 69, one or more support walls 72, 73, and base wall 74 may form all or portions of the, preferably rectangular prism shaped coupler cavity 18.

In preferred embodiments, a top surface 15 may comprise a first mounting surface 15A and a second mounting surface 15B, and a first slot 13 may separate all or portions of the first mounting surface 15A from the second mounting surface 15B. In further preferred embodiments, a top surface 15 may comprise a first mounting surface 15A and a second mounting surface 15B that may each be substantially planar in shape and which may also be substantially parallel to each other.

In further preferred embodiments, a top surface 15 may comprise a third mounting surface 15C and a fourth mounting surface 15D, and a second slot 14 may separate all or portions of the third mounting surface 15C from the fourth mounting surface 15D. In further preferred embodiments, a top surface 15 may comprise a third mounting surface 15C and a fourth mounting surface 15D that may each be substantially planar in shape and which may also be substantially parallel to each other.

Figure 7:
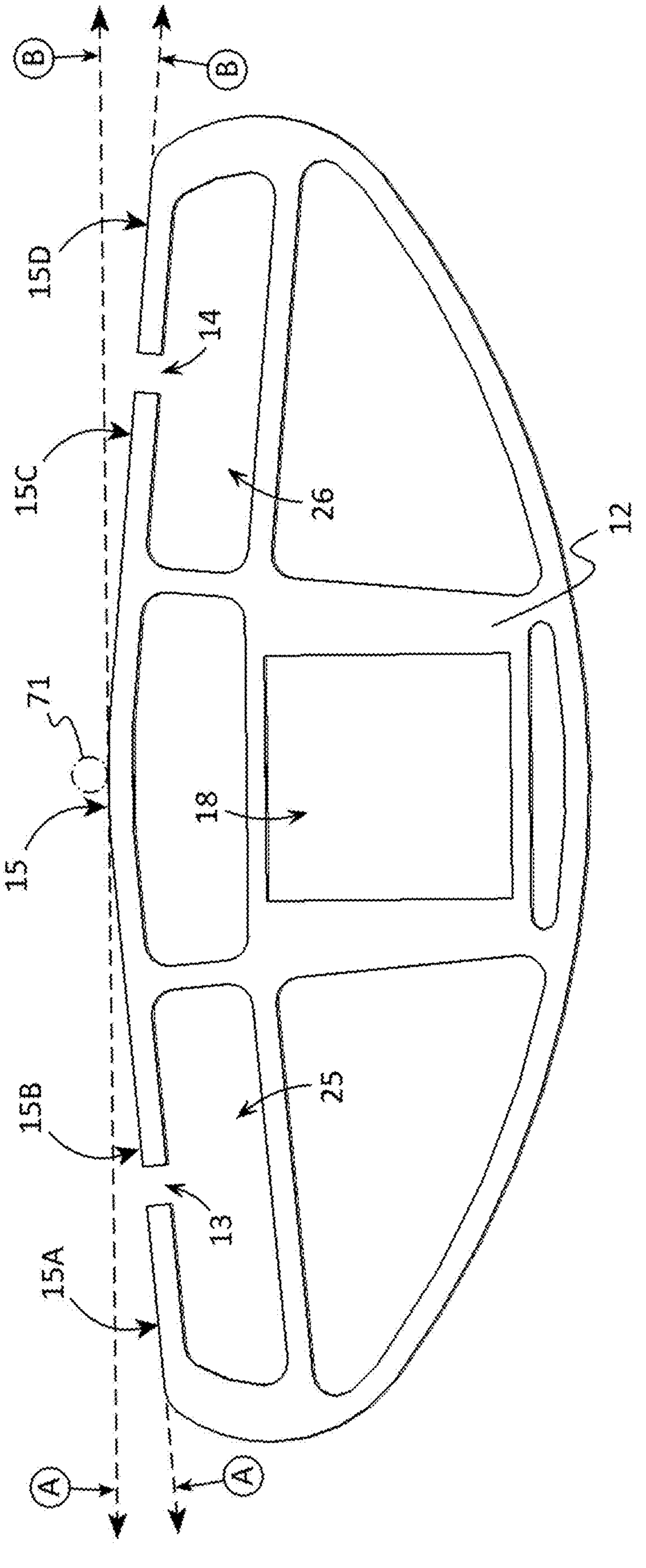
FIG. 7 depicts a front elevation view of another example of a mounting plate according to various embodiments described herein.

In some embodiments, one or more mounting surfaces 15A, 15B, 15C, 15D, may be angled above or below (as shown in FIG. 7) a central longitudinal axis 71. In further embodiments, a first 15A and second 15B mounting surface may be angled below a central longitudinal axis 71 as shown with angle A (FIG. 7). In this manner the first 15A and second 15B mounting surfaces may be sloped downwardly away from the central longitudinal axis 71. In further embodiments, a third 15C and fourth 15D mounting surface may be angled below a central longitudinal axis 71 as shown with angle B (FIG. 7). In this manner the third 15C and fourth 15D mounting surfaces may be sloped downwardly away from the central longitudinal axis 71. In some embodiments, angle A and/or angle B may be between approximately 0.1 to 30 degrees, with zero degrees being substantially level/in the same plane as the longitudinal axis 71. Angles A and B may allow two or more bicycles 300 secured via one of their crank arms 301 to a respective crank receiver 31, 31A, 31B, on the device 100 to be angled or sloped away from each other (by the angle of the mounting surface 15A, 15B, 15C, 15D, which may be imparted from the mounting surface 15A, 15B, 15C, 15D, to the support base 16, 16A, 16B, and to the bicycle 300 coupled thereto), the slope serving to elevate bicycle handlebars 304 higher than the rear of the bicycle 300 to avoid interference between adjacent bicycles 300 being supported by the device 100 so that their handle bars 304 and other elements do not interfere with each other.

In some embodiments, a mounting plate 12 may comprise one or more slots, such as a first slot 13 and a second slot 14, which may be formed into a top surface 15, and more preferably formed into, between, etc., one or more mounting surfaces 15A, 15B, 15C, 15D, of the mounting plate 12. In further embodiments, a mounting plate 12 may comprise a first slot 13 that may extend longitudinally (substantially parallel to the central axis 71) along the top surface 15 of the mounting plate and a second slot also extending longitudinally (substantially parallel to the central axis 71) along the top surface 15 of the mounting plate, and the first slot 13 may be spaced apart from the second slot 14. In preferred embodiments, a mounting plate 12 may comprise a first slot 13 that may be substantially parallel to a second slot 14. Preferably, each slot 13, 14, may be in communication with a lock cavity 25, 26. For example, a first slot 13 may be in communication with a first lock cavity 25 and a second slot 14 may be in communication with a second lock cavity 26.

Figure 9:
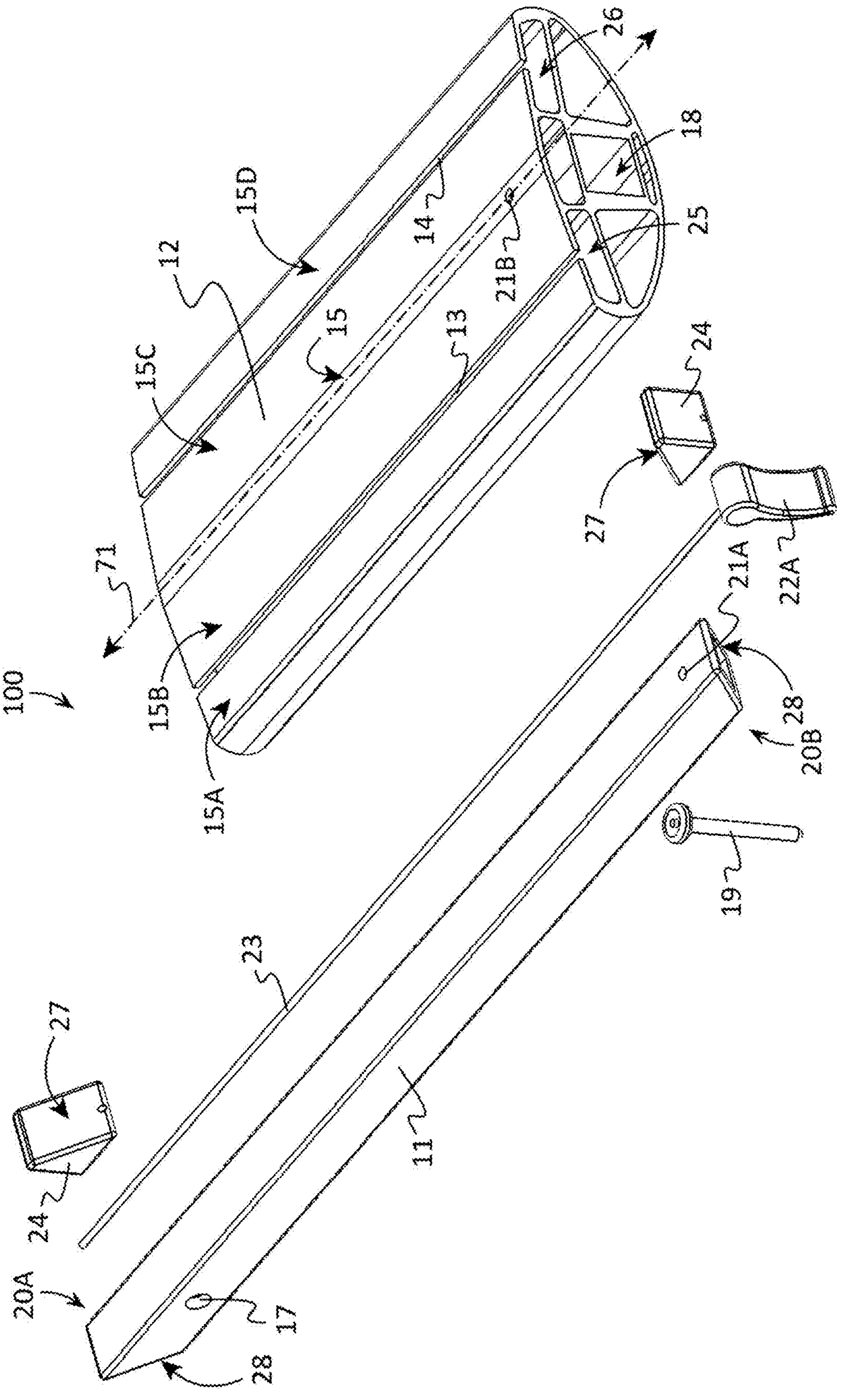
FIG. 9 shows a perspective exploded view of another example of a modular securement device according to various embodiments described herein.
Figure 10:
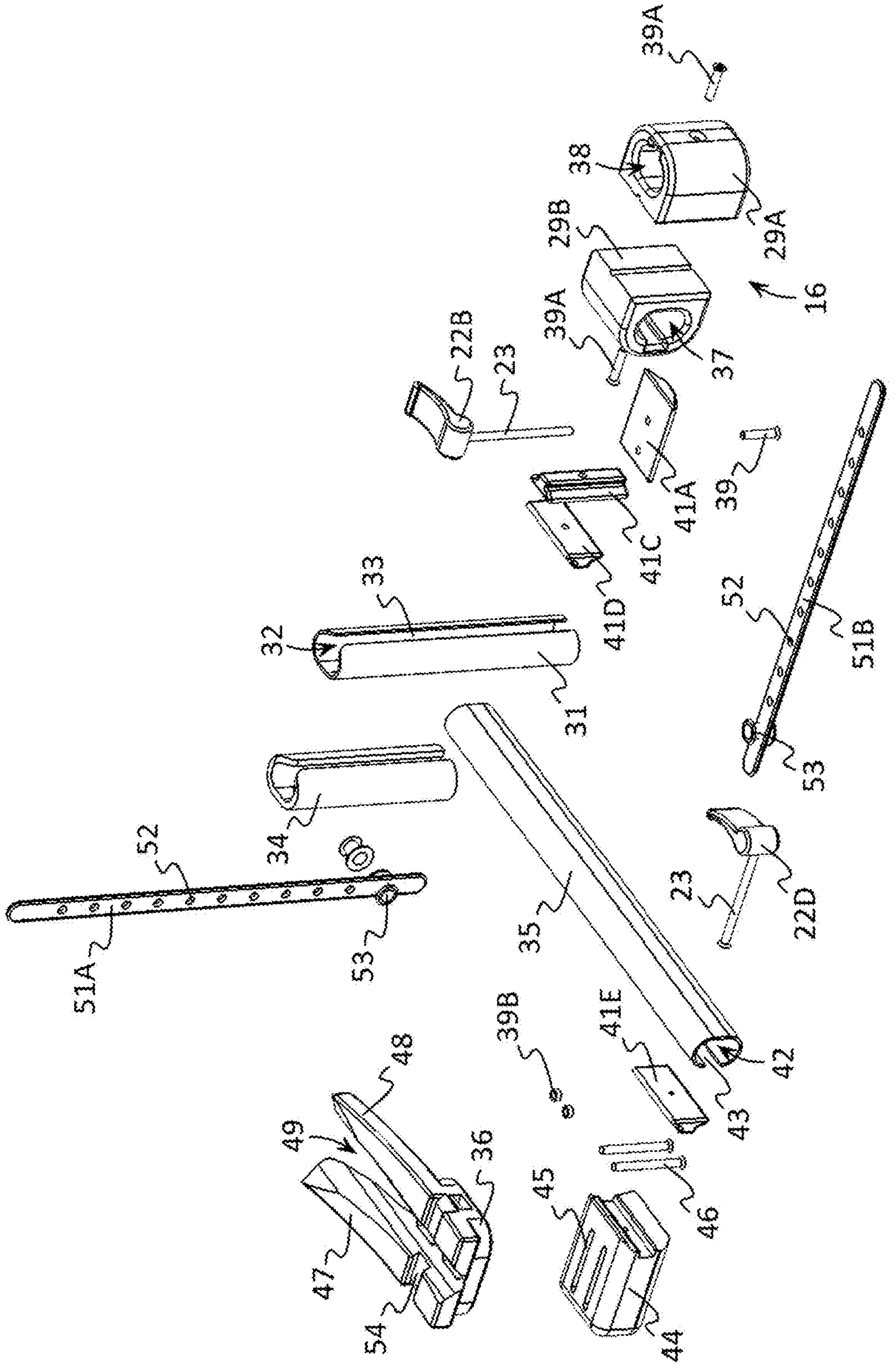
FIG. 10 depicts a perspective exploded view of some optional example elements of a modular securement device according to various embodiments described herein.
Figure 11:
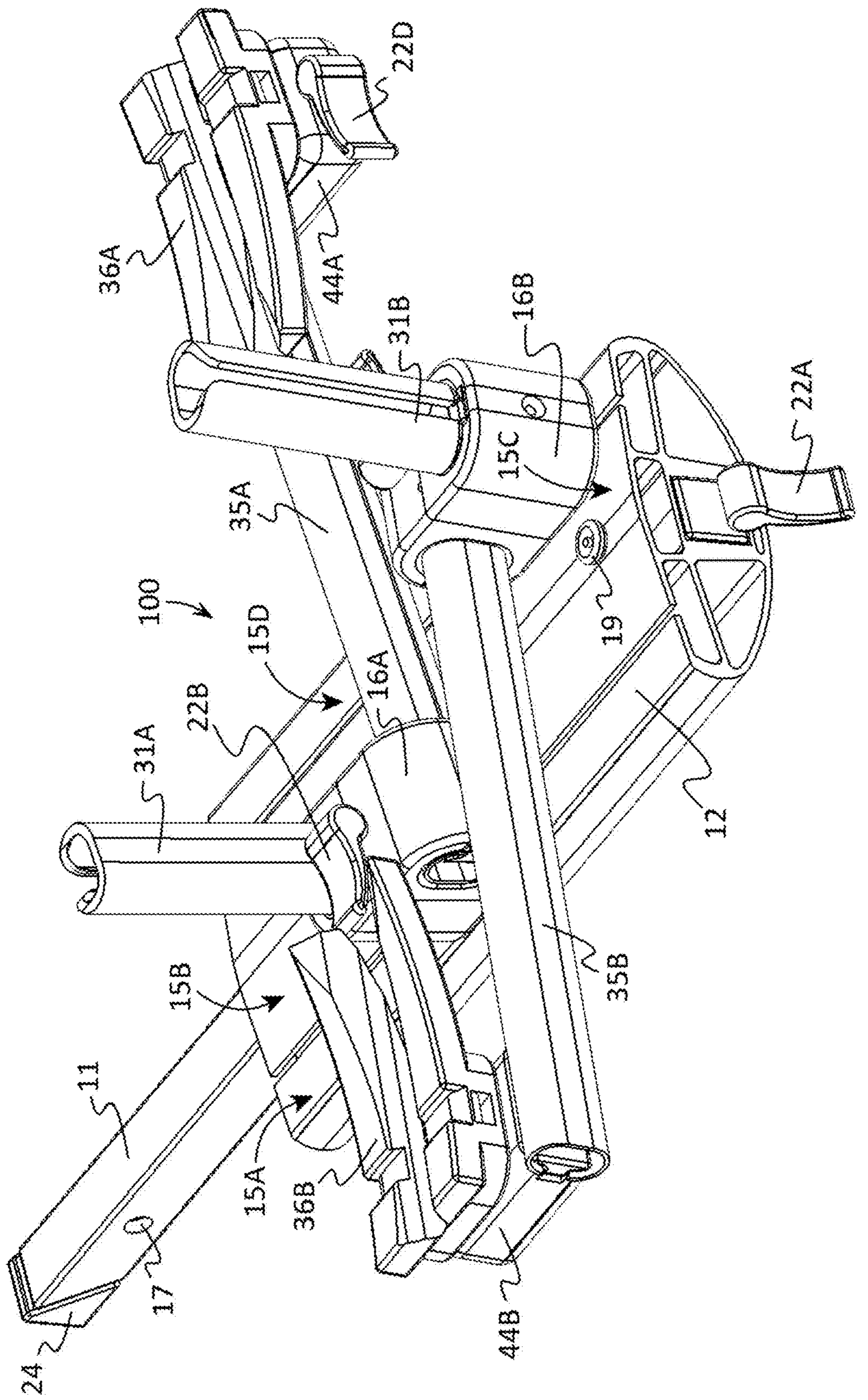
FIG. 11 illustrates a top perspective view of a further example of a modular securement device according to various embodiments described herein.
Figure 12:
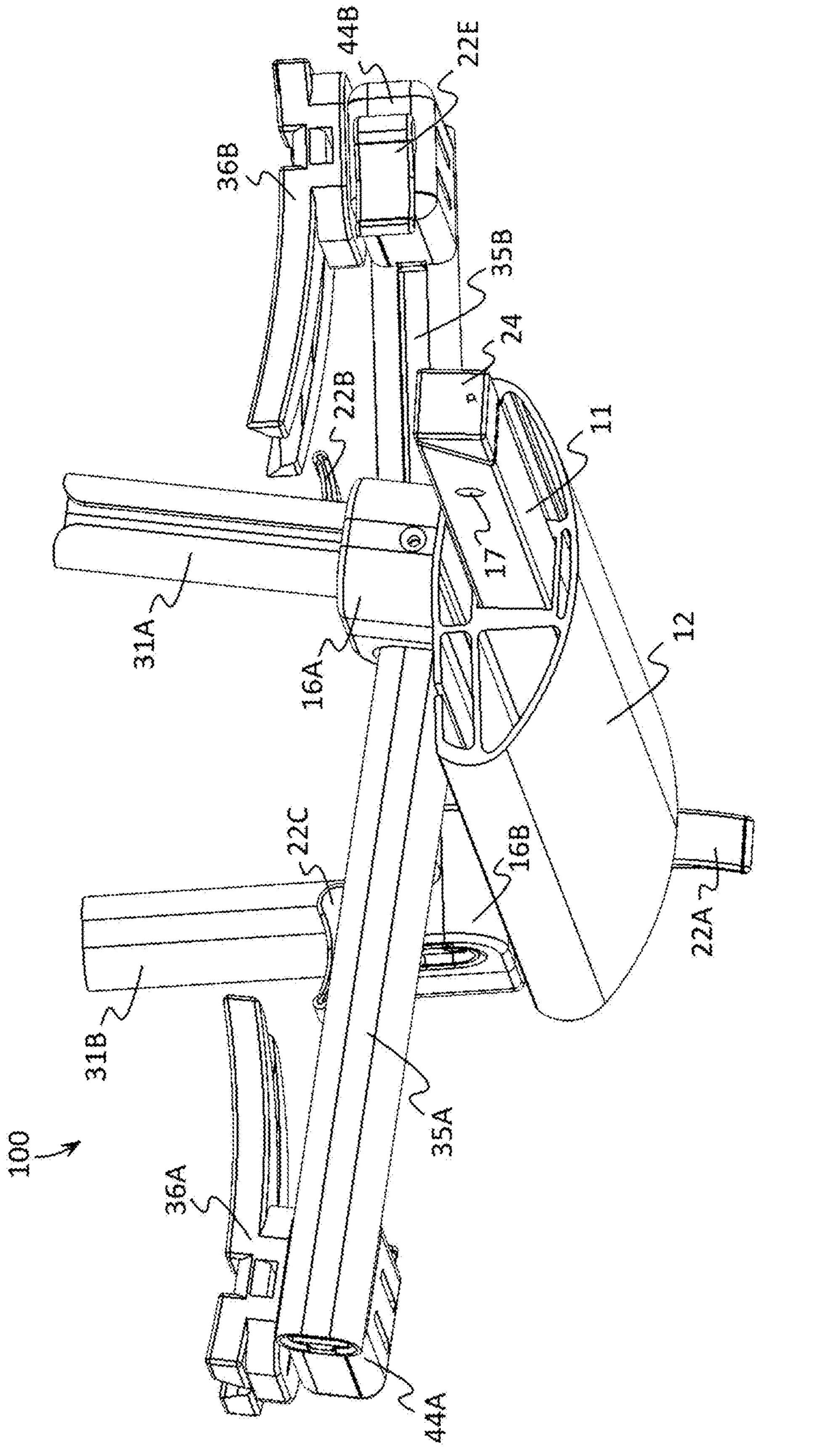
FIG. 12 shows a bottom perspective view of a further example of a modular securement device according to various embodiments described herein.
Figure 13:
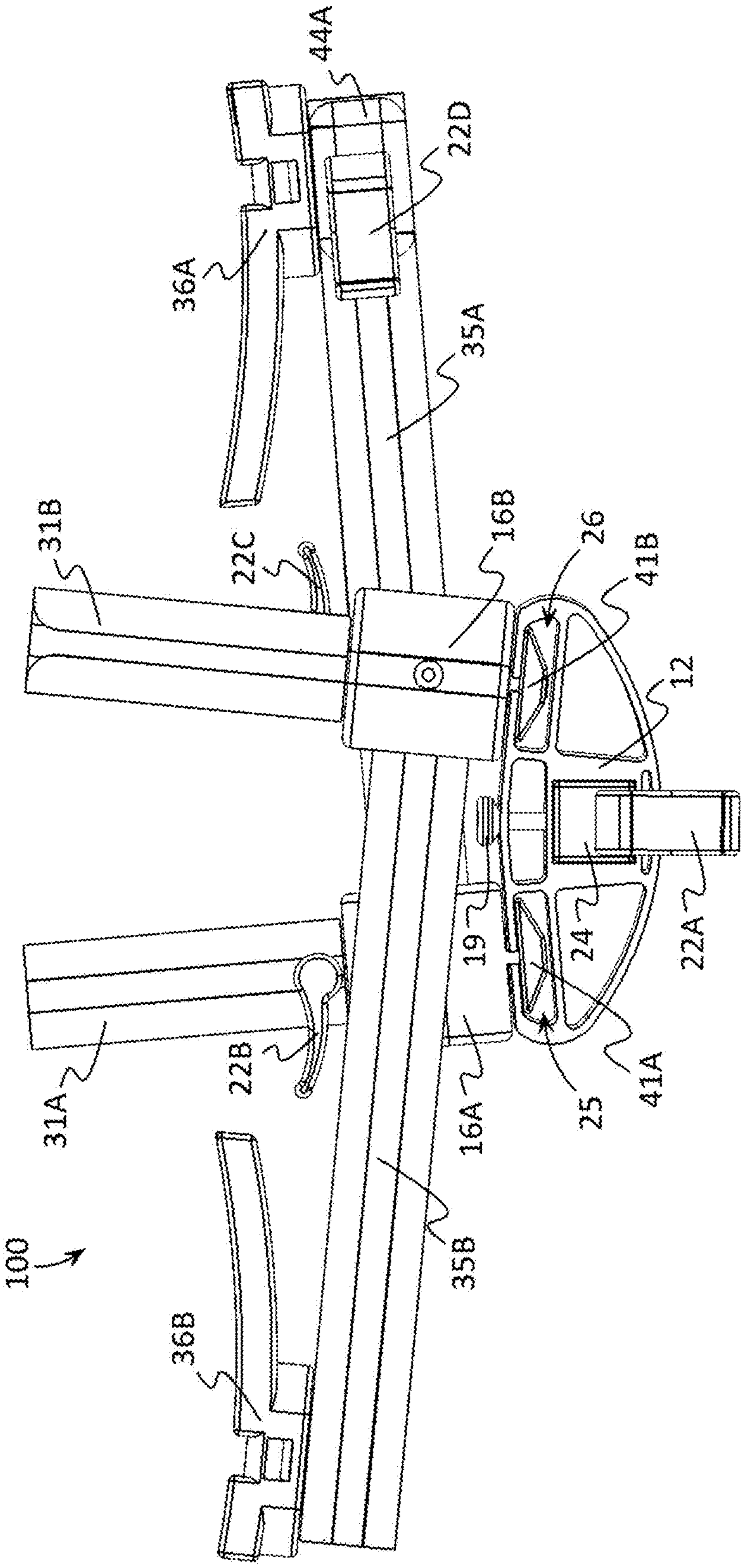
FIG. 13 depicts a front elevation view of a further example of a modular securement device according to various embodiments described herein.
Figure 14:
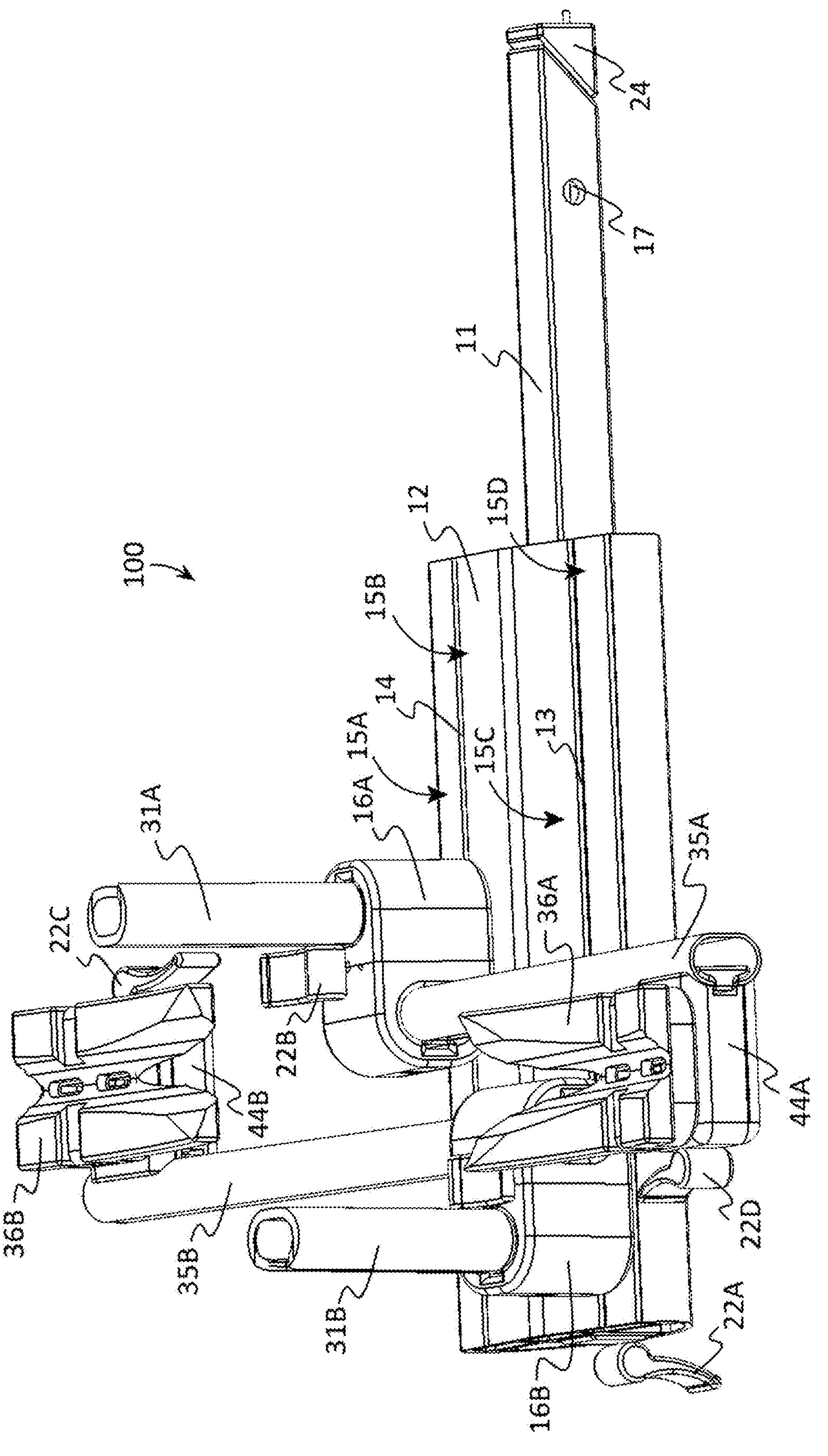
FIG. 14 illustrates a top perspective view of a further example of a modular securement device according to various embodiments described herein.
Figure 15:
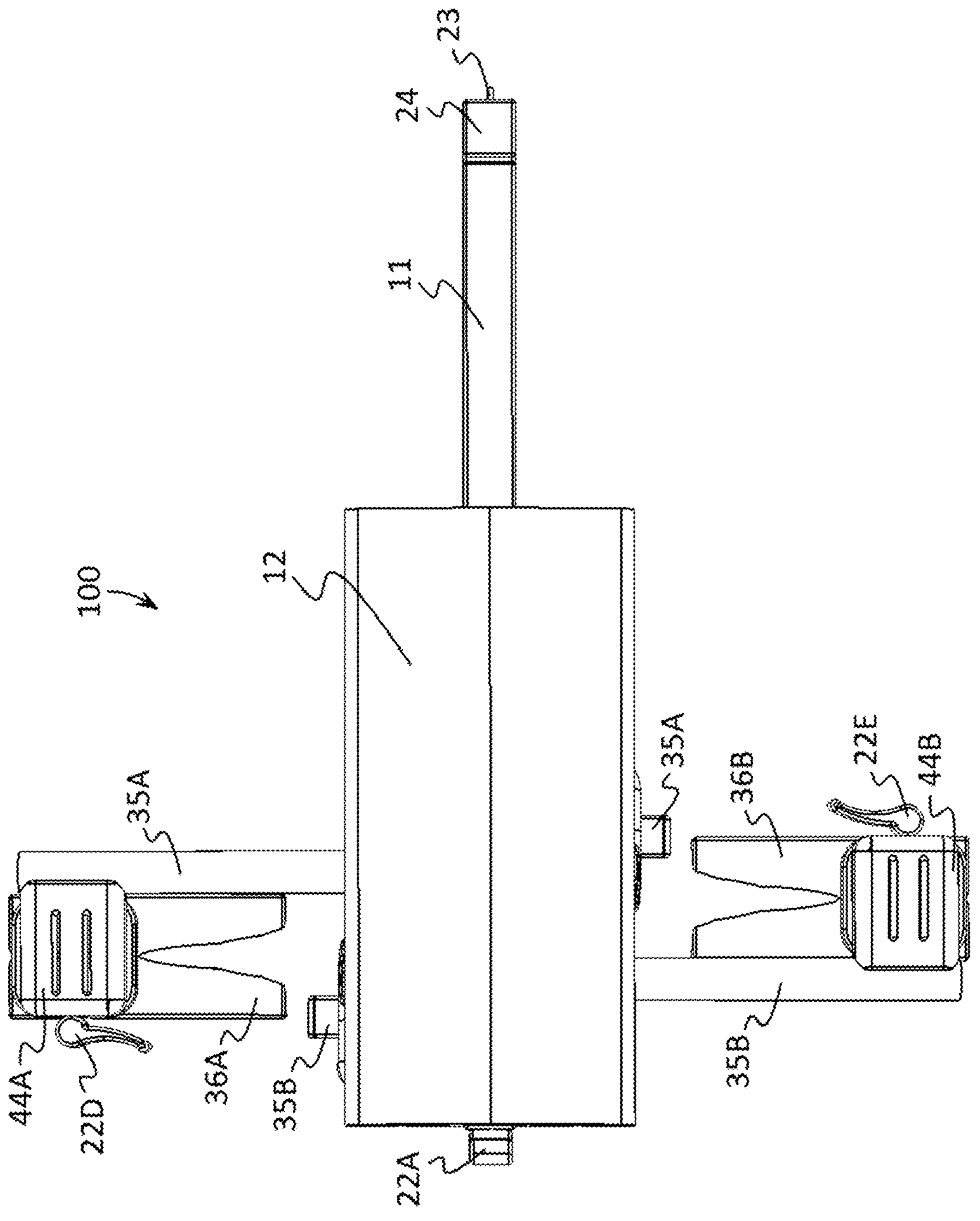
FIG. 15 shows a bottom plan view of a further example modular securement device according to various embodiments described herein.

In some embodiments and as perhaps best shown in FIG. 9, a mounting plate 12 may comprise one or more grooves 55, 56, 57, 58, which may mate with or engage with one or more groove channels 61, 62, which may be formed on a base lock plate 41A, 41B. In preferred embodiments, two grooves 55, 56, 57, 58, may extend along each slot 13, 14, and each groove 55, 56, 57, 58, may be slidably received in a groove channel 61, 62. In further embodiments, a base lock plate 41A, 41B, that is to be disposed in a lock cavity 25, 26, may comprise one or more guide projections 59 which may extend up from the base lock plate 41A, 41B, past one or more grooves 55, 56, 57, 58, and into the slot 13, 14. Grooves 55, 56, 57, 58, guide projections 59, and groove channels 61, 62, may be configured in any shape and size to enable the grooves 55, 56, 57, 58, and groove channels 61, 62, to be slidably engaged and to enable the guide projections 59 and slots 13, 14, to be slidably engaged. Preferably, the engagement between the grooves 55, 56, 57, 58, and groove channels 61, 62, may prevent the portions of the mounting plate 12 forming the slots 13, 14, from deforming (such as by the slots 13, 14, pulling apart or surface 15, 15A, 15B, 15C, 15D, twisting/bending) upon the application of the weight of a bicycle 300, support base 16, 16A, 16B, crank receiver 31, 31A, 31B, and other elements of the device 100 that are coupled to the mounting plate 12 through the engagement of the base lock plate 41A, 41B, and support base 16, 16A, 16B, coupled thereto.

In some embodiments, the device 100 may comprise a support base 16, 16A, 16B, which may be coupled directly to a lateral support 35, 35A, 35B, such as by being integrally formed or molded together, via welding, fastener(s), or any other suitable coupling method. In further embodiments, the device 100 may comprise one or more support bases 16, 16A, 16B, which may be configured to secure and position a crank receiver 31, 31A, 31B, a lateral support 35, 35A, 35B, and other elements of the device 100. A support base 16, 16A, 16B, may be configured in any size and shape. In preferred embodiments, a support base 16, 16A, 16B, may comprise a lateral aperture 37 and a vertical aperture 38. A lateral aperture 37 may be sized and shaped to receive portions of a lateral support 35, 35A, 35B, and a vertical aperture 38 may be sized and shaped to receive portions of a crank receiver 31, 31A, 31B. Optionally, a support base 16, 16A, 16B, may be formed of one or more subunits, such as a first subunit 29A, into which as vertical aperture 38 may be formed, and a second subunit 29B, into which a lateral aperture 37 may be formed, and the subunits 29A, 29B, may be coupled together via fasteners 39A, 39B, such as screws, bolts, nuts, rivets, heat bonding or welding, being integrally formed, molded, machined, or other coupling method. In further embodiments, a support base 16, 16A, 16B, may comprise welding, one or more fasteners, or any other method or device that may be used to couple a support base 16, 16A, 16B, to a lateral support 35, 35A, 35B, and/or to couple a support base 16, 16A, 16B, to a mounting plate 12.

In some embodiments, a support base 16, 16A, 16B, may be removably coupled to a surface 15, 15A, 15B, 15C, 15D, via engagement of the support base 16, 16A, 16B, with a slot 13, 14, of a mounting plate 12 so that the support base 16, 16A, 16B, and mounting plate 12 may be alternatively separated and re-coupled together. In further embodiments, a support base 16, 16A, 16B, may be movably coupled to a surface 15, 15A, 15B, 15C, 15D, of a mounting plate 12 so that the support base 16, 16A, 16B, may be positioned and repositioned at various locations on the mounting plate 12 so that the bike mount assembly (having major elements 16, 16A, 16B, 31, 31A, 31B, 35, 35A, 35B, and 36, 36A, 36B) can be infinitely adjusted and positioned along a slot 13, 14, to improve fit and prevent interference between adjacent bicycles 300 coupled to the device 100.

In preferred embodiments, a support base 16, 16A, 16B, may be removably and/or movably coupled to a surface 15, 15A, 15B, 15C, 15D, of a mounting plate 12 via a base cam lock 22B and a base lock plate 41A, 41B, which may be coupled via a lock bar 23 so that the support base 16, 16A, 16B, may be coupled to the mounting plate 12 via a single mounting location. The base lock plate 41A, 41B, may be positioned within a lock cavity 25, 26, while the lock bar 23 extends through a slot 13, 14, and through portions of the support base 16, 16A, 16B. Loosening the base cam lock 22B may allow the support base 16, 16A, 16B, to be moved to different locations along the slot 13, 14, while tightening the base cam lock 22B may cause the base lock plate 41A, 41B, to tighten against portions of the mounting plate 12 forming the lock cavity 25, 26, to frictionally lock the position of the support base 16, 16A, 16B, on the mounting plate 12. In this manner, a support base 16, 16A, 16B, may be moveably coupled to the mounting plate 12 via engagement with a slot 13, 14. In further embodiments, any suitable movable and/or removable coupling method may be used to couple a mounting plate 12 to a support base 16, 16A, 16B. In alternative embodiments, a mounting plate 12 and a support base 16, 16A, 16B, may be fixedly coupled or generally not movable or not removable.

Figure 16:
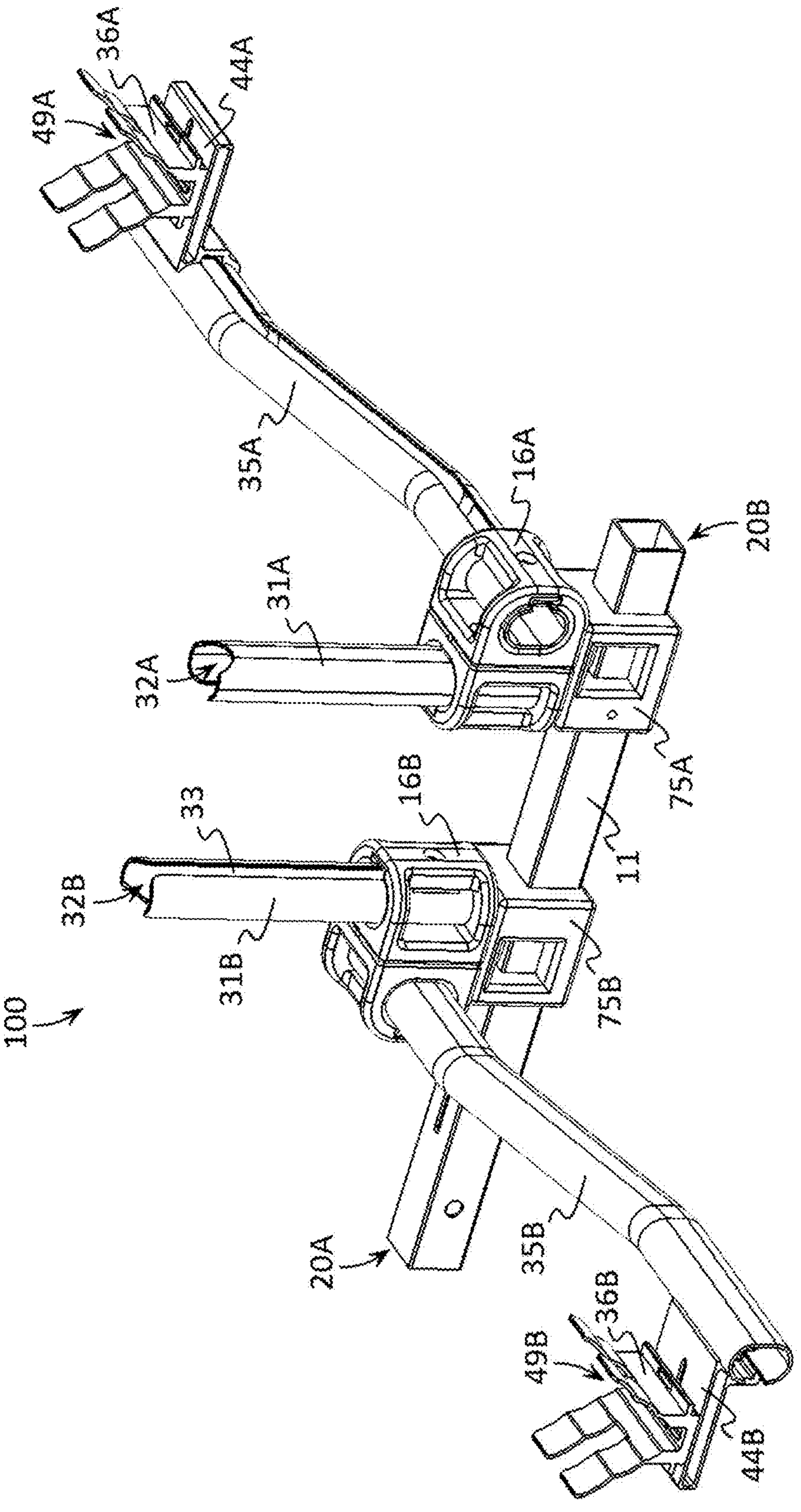
FIG. 16 depicts a top perspective view of yet a further example of a modular securement device according to various embodiments described herein.
Figure 17:
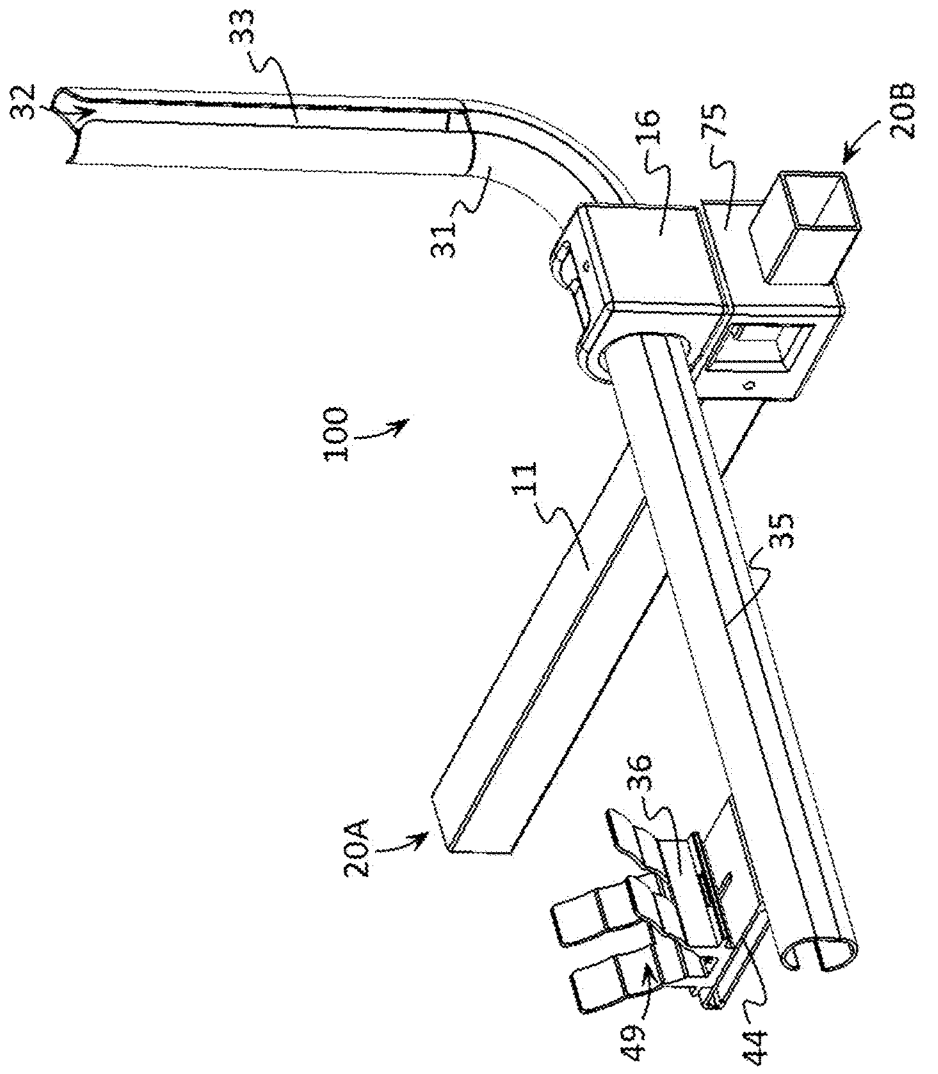
FIG. 17 illustrates a top perspective view of still yet a further example of a modular securement device according to various embodiments described herein.

In some embodiments, a support base 16, 16A, 16B, may comprise a base receiver 75, 75A, 75B, which may be configured to couple a crank receiver 31, 31A, 31B, and/or a lateral support 35, 35A, 35B, to a receiver coupler 11 as shown in FIGS. 16 and 17. A base receiver 75, 75A, 75B, may be configured in any shape and size, such as the generally rectangular prism shape as perhaps best depicted in FIGS. 18A and 18B.

Figure 18A:
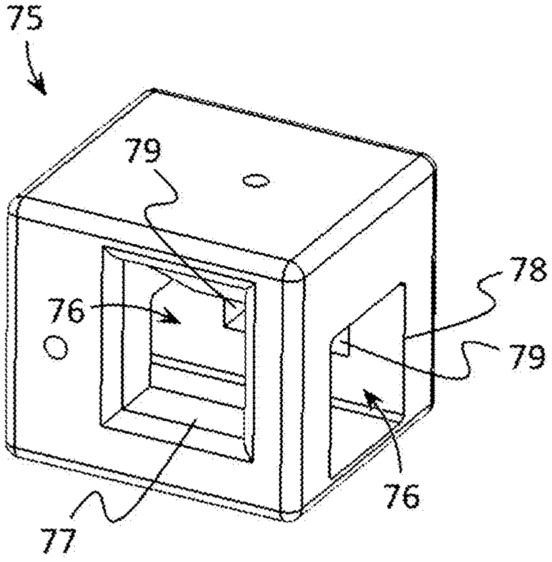
FIG. 18A shows a top perspective view of an example of a base receiver according to various embodiments described herein.
Figure 18B:
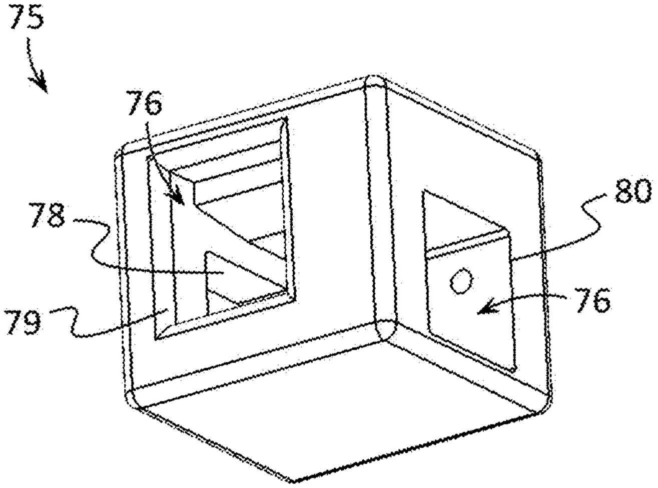
FIG. 18B depicts a bottom perspective view the example base receiver of FIG. 18A according to various embodiments described herein.

Referring to the example base receiver 75 illustrated in FIGS. 18A and 18B, and in preferred embodiments, a base receiver 75, 75A, 75B, may comprise a base cavity 76 which may be sized and shaped to receive a portion of a receiver coupler 11 that the base receiver 75, 75A, 75B, may be coupled to. A base receiver 75, 75A, 75B, may also comprise one or more base apertures 77, 78, 79, 80, which may be in communication with a base cavity 76 of the base receiver 75, 75A, 75B. Generally, a base aperture 77, 78, 79, 80, may also be sized and shaped to receive a portion of a receiver coupler 11 that the base receiver 75, 75A, 75B, may be coupled to.

In preferred embodiments, a base receiver 75, 75A, 75B, may be coupled to a receiver coupler 11 by inserting a portion of a receiver coupler 11 into a base cavity 76 through one or more, such as two base apertures 77, 78, 79, 80, with one or more fasteners or any other suitable coupling method used to secure the base receiver 75, 75A, 75B, and receiver coupler 11 together. In further preferred embodiments, a base receiver 75, 75A, 75B, may be repositionably coupled to a receiver coupler 11 so that the base receiver 75, 75A, 75B, may be coupled to at least two different locations on the receiver coupler 11, such as to a position relatively closer to the first end 20A of the receiver coupler 11 and to another position relatively closer to the second end 20B of the receiver coupler 11, using threaded fasteners, cam lock fasteners, or any other suitable removable or repositionable coupling method. In further embodiments, a base receiver 75, 75A, 75B, may be coupled to a receiver coupler 11 via one or more fasteners, by being welded or heat bonded, or via any other suitable coupling method. In still further embodiments, a support base 16, 16A, 16B, may be coupled directly to a receiver coupler 11, optionally via a base receiver 75, 75A, 75B, without the use of a mounting plate 12.

A crank receiver 31, 31A, 31B, may be configured in any size and shape, and may comprise a crank cavity 32, 32A, 32B, and a vertical groove 33 which may be sized and shaped to receive portions of a bicycle, such as one of its crank arms 301 that a pedal 303 is coupled too. Preferably, portions of a crank arm 301 may be inserted into the crank cavity 32, 32A, 32B, while the vertical groove 33 may allow the pedal 303 that is coupled to the crank arm 301 to be portioned outside of the crank cavity 32, 32A, 32B. A crank receiver 31, 31A, 31B, may be made from or may comprise aluminum, steel, any suitable metal alloy, or other durable, weight bearing materials. Preferably, the crank receiver 31, 31A, 31B, may support all or substantially all of the weight of a bicycle 300 via supporting a crank arm 301 of a bicycle 300 to support all or substantially all the weight of bicycle 300 by its longitudinal center of gravity with wheel support 36, 36A, 36B, serving only to prevent bicycle 300 vertical rotation around receiver coupler 11, and to prevent lateral wheel and handlebar rotation, but not support weight. This allows for the reduction in components and weight of the device 100, whereas all other existing bike racks require lateral weight bearing structures (for supporting front and/or back of bicycle 300), adding material and weight.

Any suitable method for coupling a crank receiver 31, 31A, 31B, to a mounting plate 12 and/or to a receiver coupler 11 may be used, such as via an optional support base 16, 16A, 16B. In some embodiments, the device 100 may comprise a lateral lock plate 41C, 41D, which may be positioned within the crank cavity 32, 32A, 32B, and a desired portion of the crank receiver 31, 31A, 31B, may be positioned in the vertical aperture 38. A fastener 39A, 39B, may tension the lateral lock plate 41C, 41D, towards the support base 16, 16A, 16B, to clamp the crank receiver 31, 31A, 31B, to the support base 16, 16A, 16B, thereby movably coupling the crank receiver 31, 31A, 31B, and support base 16, 16A, 16B, together depending on the tension of the fastener 39A, 39B. By loosening the fastener 39A, 39B, different portions of the crank receiver 31, 31A, 31B, may be positioned in the vertical aperture 38.

In preferred embodiments, a crank receiver 31, 31A, 31B, may comprise a sleeve 34 of a non-marring material, such as plastic, rubber, etc., which may fit over or otherwise be coupled to the durable, weight bearing materials of the crank receiver 31, 31A, 31B, so that the sleeve 34 may prevent scratching or other damage of a crank arm 301, pedal 303, etc., that is being supported by the crank receiver 31, 31A, 31B. For example, a sleeve 34 may comprise a coating of rubber, plastic, or other non-marring material, that may be applied to the crank receiver 31, 31A, 31B, such as by dipping the crank receiver 31, 31A, 31B, in a liquid non-marring material and allowing it to dry on the crank receiver 31, 31A, 31B.

The device 100 may comprise a lateral support 35, 35A, 35B, which may be coupled to the support base 16, 16A, 16B, and a wheel support 36, 36A, 36B, that may also be coupled to the lateral support 35, 35A, 35B. The lateral support 35, 35A, 35B, may be configured to separate the wheel support 36, 36A, 36B, a desired distance from the crank receiver 31, 31A, 31B. A lateral support 35, 35A, 35B, may be configured in any size and shape and may be made from or may comprise aluminum, steel, any suitable metal alloy, or other durable, materials. In some embodiments, a lateral support 35, 35A, 35B, may be configured similarly to a crank receiver 31, 31A, 31B, and the lateral support 35, 35A, 35B, may comprise a plate cavity 42 and a horizontal groove 43. Optionally, and as perhaps best shown in FIGS. 1 and 3-5, a lateral support 35, 35A, 35B, may comprise one or more bends which may enable or facilitate the ability of a wheel support 36, 36A, 36B, that is coupled to the lateral support 35, 35A, 35B, to be positioned in line with the front tire of a bicycle 300 that is being supported by a crank receiver 31, 31A, 31B, that the lateral support 35, 35A, 35B, is coupled to. In other embodiments, a lateral support 35, 35A, 35B, may be configured in any shape and size.

Any suitable method for coupling a lateral support 35, 35A, 35B, to a support base 16, 16A, 16B, may be used. In some embodiments, the device 100 may comprise a lateral lock plate 41C, 41D, which may be positioned within the plate cavity 42, and a desired portion of the lateral support 35, 35A, 35B, may be positioned in the lateral aperture 37. A fastener 39A, 39B, may extend through the horizontal groove 43 to tension the lateral lock plate 41C, 41D, towards the support base 16, 16A, 16B, for clamping the lateral support 35, 35A, 35B, to the support base 16, 16A, 16B, thereby movably coupling the lateral support 35, 35A, 35B, and support base 16, 16A, 16B, together depending on the tension of the fastener 39A, 39B. By loosening the fastener 39A, 39B, different portions of the lateral support 35, 35A, 35B, may be positioned in the lateral aperture 37 to allow the distance between the wheel support 36, 36A, 36B, and support base 16, 16A, 16B, to be changed to accommodate different sized bicycles 300.

Figure 19:
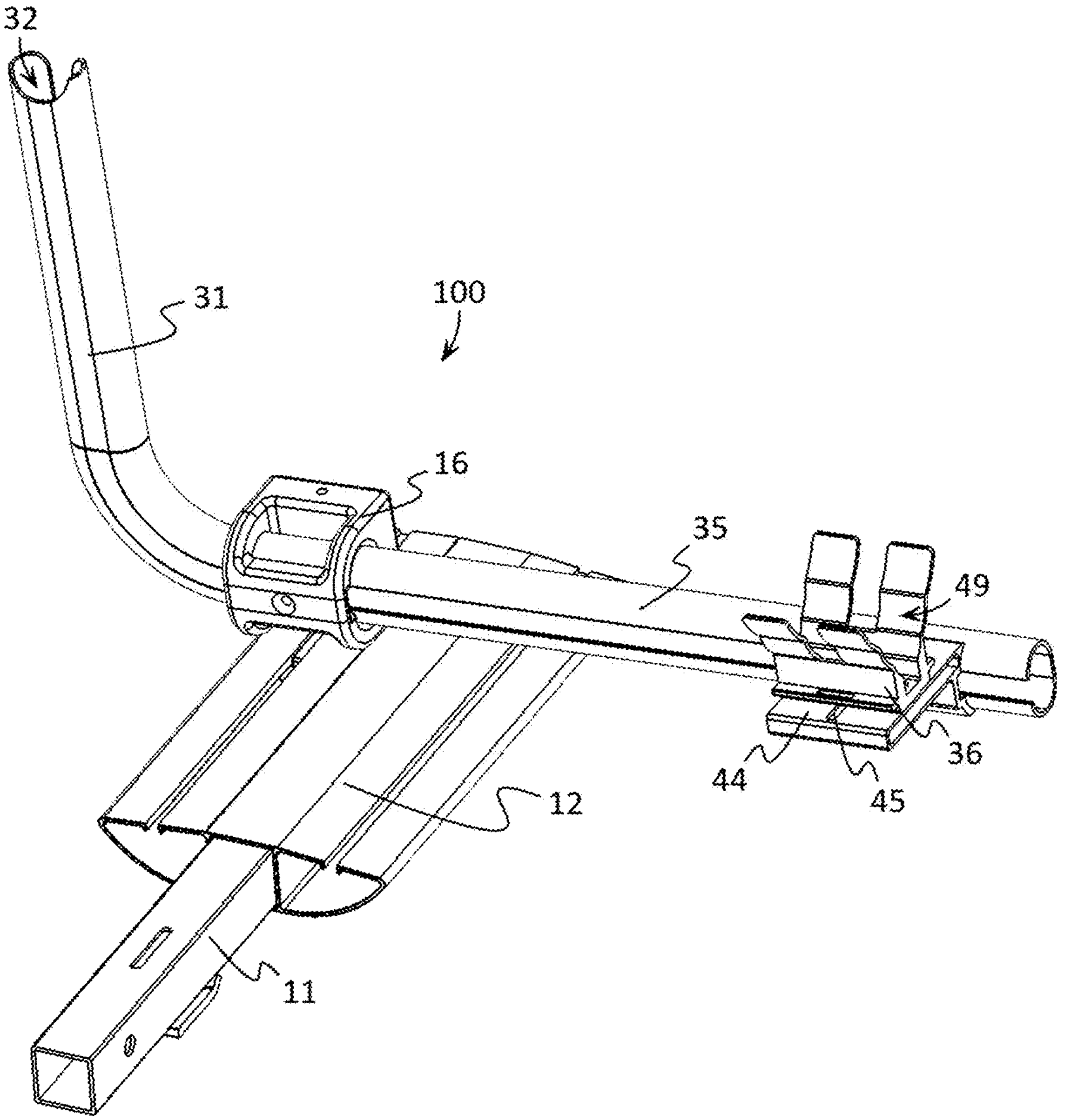
FIG. 19 illustrates a rear perspective view of still yet another example of a modular securement device according to various embodiments described herein.
Figure 20:
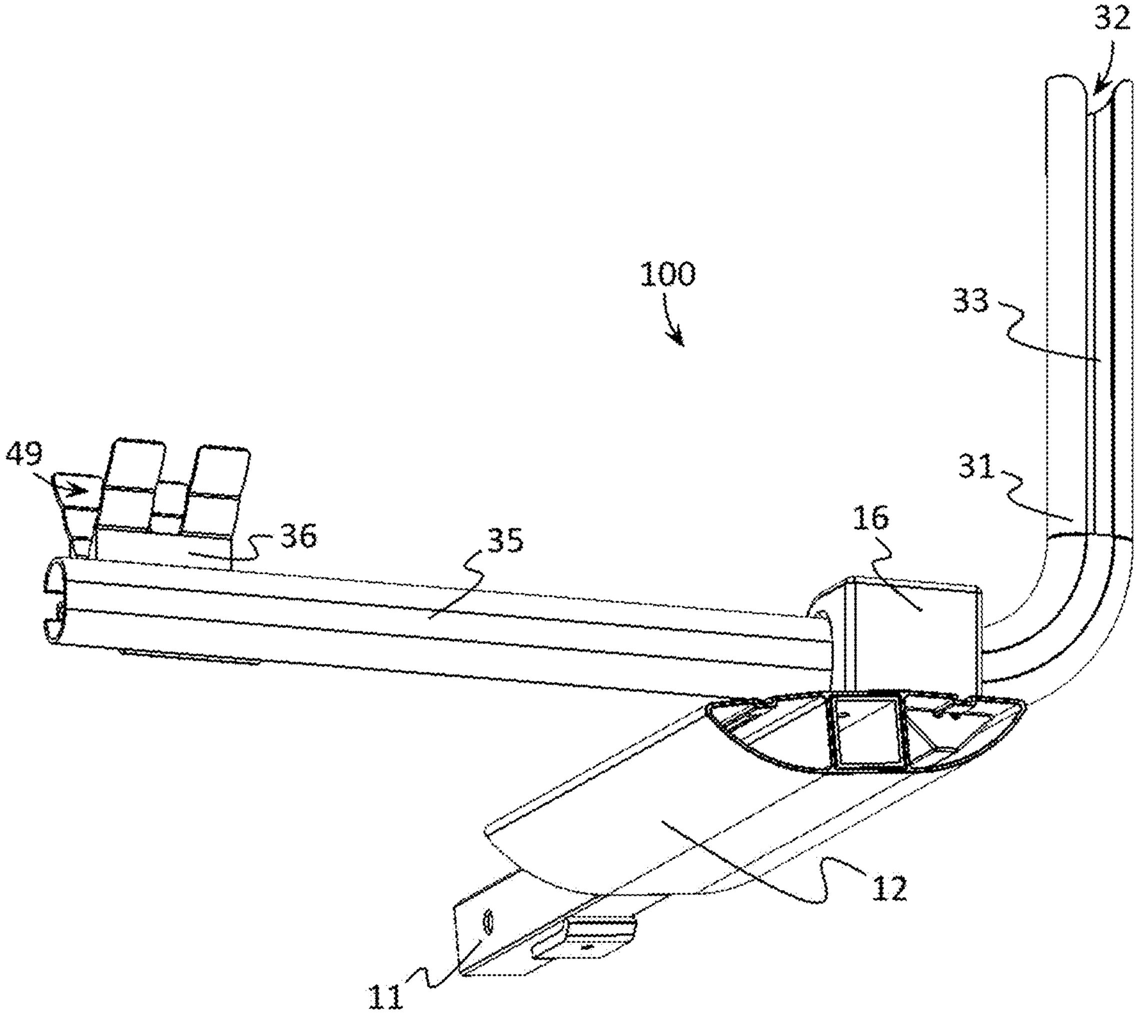
FIG. 20 shows a rear perspective view the example modular securement device of FIG. 19 according to various embodiments described herein.

In some embodiments, a crank receiver 31, 31A, 31B, and a lateral support 35, 35A, 35B, may be coupled together via a support base 16, 16A, 16B as perhaps best shown in FIGS. 1, 2, 10, 11, 14, and 16. In further embodiments, a crank receiver 31, 31A, 31B, and a lateral support 35, 35A, 35B, may be coupled together by being coupled directly to each other. As a preferred example, and referring to the examples of FIGS. 17, 19, and 20, a crank receiver 31, 31A, 31B, and a lateral support 35, 35A, 35B, may be coupled together by being integrally formed together, such as by being molded or machined together, as a single unit, e.g., comprising a single length of tubing that may be bent to form a crank receiver 31, 31A, 31B, and a lateral support 35, 35A, 35B. As further examples, a crank receiver 31, 31A, 31B, and a lateral support 35, 35A, 35B, may be coupled together by being coupled directly to each other via welding or heat bonding, adhesive, one or more fasteners, or any other suitable coupling method.

A wheel support 36, 36A, 36B, may be coupled to the lateral support 35, 35A, 35B, preferably via a support block 44, 44A, 44B. In some embodiments, a support block 44, 44A, 44B, and a wheel support 36, 36A, 36B, coupled to the support block 44, 44A, 44B, may be removably and/or movably coupled to the lateral support 35, 35A, 35B, so that the support block 44, 44A, 44B, and wheel support 36, 36A, 36B, may be positioned and repositioned at various locations on the lateral support 35, 35A, 35B. In this manner, a wheel support 36, 36A, 36B, and a lateral support 35, 35A, 35B, may be repositionably coupled together so that the wheel support may 36, 36A, 36B, be repositionable relative to the lateral support 35, 35A, 35B, such as by being positionable relatively closer to the lateral support 35, 35A, 35B, and also positionable relatively farther from the lateral support 35, 35A, 35B.

In preferred embodiments, a support block 44, 44A, 44B, may be removably and/or movably coupled to a lateral support 35, 35A, 35B, via a block cam lock 22D, 22E, and a wheel lock plate 41E which may be coupled via a lock bar 23. The wheel lock plate 41E may be positioned within a plate cavity 42 of the lateral support 35, 35A, 35B, while the lock bar 23 extends through the horizontal groove 43 and through portions of the support block 44, 44A, 44B. Loosening the block cam lock 22D, 22E, may allow the support block 44, 44A, 44B, and wheel support 36, 36A, 36B, to be moved to different locations along the lateral support 35, 35A, 35B, while tightening the block cam lock 22D, 22E, may cause the wheel lock plate 41E to tighten against portions of the lateral support 35, 35A, 35B, forming the plate cavity 42 to frictionally lock the position of the support block 44, 44A, 44B, and wheel support 36, 36A, 36B, on the lateral support 35, 35A, 35B. In further embodiments, any suitable movable and/or removable coupling method may be used to couple a support block 44, 44A, 44B, and/or wheel support 36, 36A, 36B, to a lateral support 35, 35A, 35B. In alternative embodiments, a support block 44, 44A, 44B, and/or wheel support 36, 36A, 36B, and a lateral support 35, 35A, 35B, may be fixedly coupled or generally not movable or not removable.

Optionally, a wheel support 36, 36A, 36B, may be coupled to a lateral support 35, 35A, 35B, via support block 44, 44A, 44B. A support block 44, 44A, 44B, may be configured in any shape and size. In preferred embodiments, a wheel support 36, 36A, 36B, may be movably and/or removably coupled to a support block 44, 44A, 44B, so that the wheel support 36, 36A, 36B, may be repositionable relative to the support block 44, 44A, 44B. For example, a support block 44, 44A, 44B, may comprise one or more elongated fastener apertures 45 which may be configured to receive a wheel support cam lock 22F, 22G, a block fastener 46, other type of fastener, that may couple the support block 44, 44A, 44B, to the wheel support 36, 36A, 36B, and by positioning the wheel support cam lock 22F, 22G, block fasteners 46, etc., in different parts of the fastener apertures 45, the wheel support 36, 36A, 36B, may be repositioned relative to the support block 44, 44A, 44B. In further embodiments, any suitable movable and/or removable coupling method may be used to couple a support block 44, 44A, 44B, to a wheel support 36, 36A, 36B. By having a wheel support 36, 36A, 36B, movably and/or removably coupled to a support block 44, 44A, 44B, the wheel support 36, 36A, 36B, can be adjusted at any angle so that the interference between adjacent bicycles 300 can be prevented, and more bicycles 300 can be carried/secured in to a shorter mounting plate 12. In alternative embodiments, a support block 44, 44A, 44B, and a wheel support 36, 36A, 36B, may be fixedly coupled or generally not movable or not removable.

A wheel support 36, 36A, 36B, may be configured to immobilize a tire of a bicycle 300 that has portions of a crank arm 301 received in a crank receiver 31, 31A, 31B. A wheel support 36, 36A, 36B, may comprise any size and shape. In preferred embodiments, a wheel support 36, 36A, 36B, may comprise a first brace 47, 47A, 47B, and a second brace 48, 48A, 48B, (or any number of braces 47, 47A, 47B, 48, 48A, 48B, such as four braces 47, 47A, 47B, 48, 48A, 48B, as perhaps best shown in FIGS. 1 and 3) which may be separated by a tire channel 49, and the tire channel 49 may be generally parallel to the lateral support 35, 35A, 35B. A tire channel 49 may be shaped for receiving a portion of a tire of the bicycle 300, such as a lower portion of a tire. A lower portion of a bicycle tire may rest on the two braces 47, 47A, 47B, 48, 48A, 48B, and also be positioned between the two braces 47, 47A, 47B, 48, 48A, 48B, within portions of the tire channel 49 thereby supporting the tire.

Figure 21A:
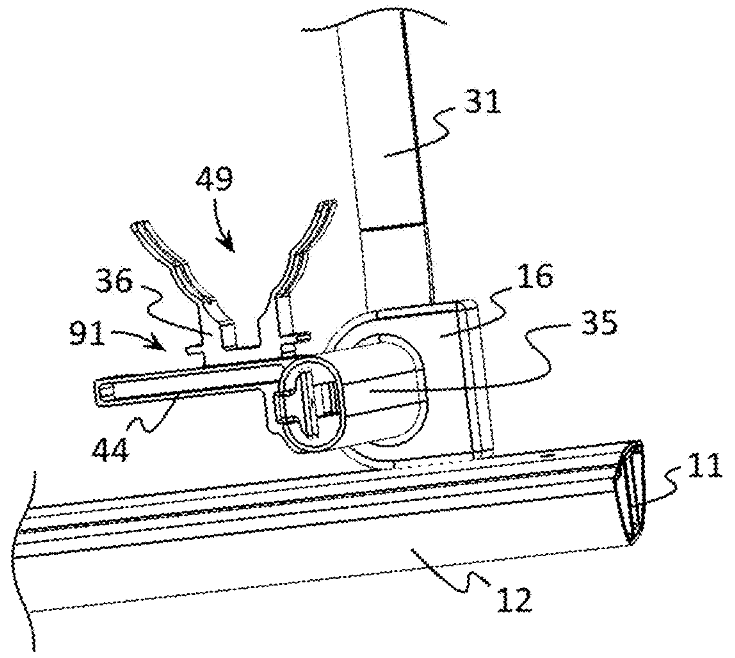
FIG. 21A depicts a side perspective view of an example of a wheel support in a first position according to various embodiments described herein.
Figure 21B:
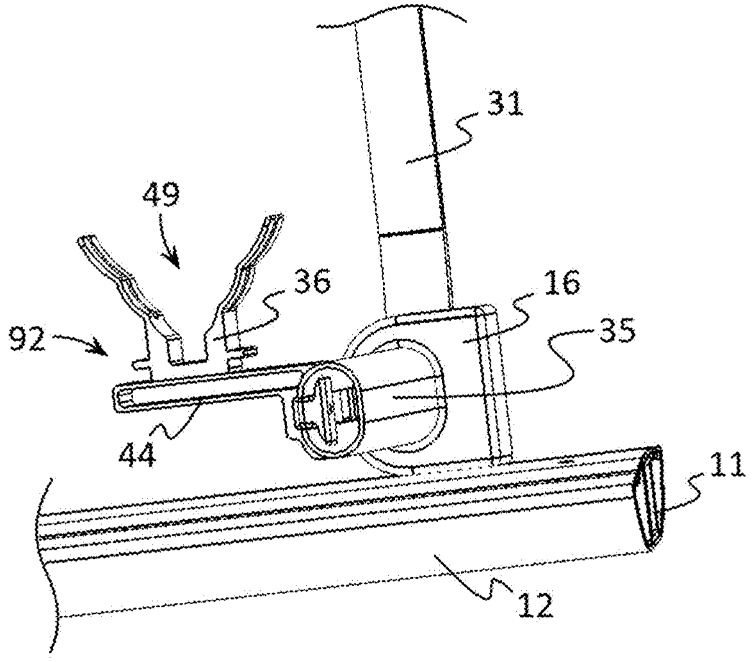
FIG. 21B illustrates a side perspective view of an example of a wheel support in a second position according to various embodiments described herein.

In preferred embodiments, and as shown in FIGS. 21A and 21B, a wheel support 36, 36A, 36B, may be movable between a first position 91, in which the tire channel 49 is positioned relatively closer to the lateral support 35, 35A, 35B, and a second position 92, in which the tire channel 49 may be positioned relatively farther from the lateral support 35, 35A, 35B. For example, a support block 44, 44A, 44B, may comprise one or more elongated fastener apertures 45 which may be configured to receive a fastener, such as a screw, that may couple the support block 44, 44A, 44B, and therefore a wheel support 36, 36A, 36B, coupled to the support block 44, 44A, 44B, and by positioning the fastener, in different parts of the fastener apertures 45, the wheel support 36, 36A, 36B, may be repositioned relative to the lateral support 35, 35A, 35B, that the support block 44, 44A, 44B, is coupled to. As another example, a wheel support 36, 36A, 36B, may comprise one or more elongated fastener apertures which may be configured to receive a fastener, such as a screw, that may repositionably couple the wheel support 36, 36A, 36B, to a lateral support 35, 35A, 35B, and by positioning the fastener, in different parts of the fastener apertures, the wheel support 36, 36A, 36B, may be repositioned relative to the lateral support 35, 35A, 35B. In further embodiments, any suitable repositionable (movable and/or removable) coupling method may be used to enable a wheel support 36, 36A, 36B, to be movable between a first position 91, in which the tire channel 49 is positioned relatively closer to the lateral support 35, 35A, 35B, and a second position 92, in which the tire channel 49 may be positioned relatively farther from the lateral support 35, 35A, 35B.

In some embodiments, the device 100 may comprise one or more securement devices 51A, 51B, which may be configured to removably couple or secure portions of a bicycle 300 to the device 100. In preferred embodiments, a securement device 51A, 51B, may comprise a length of resilient material, such as silicone, rubber, elastic, etc. having one or more securement apertures 52 and a securement fastener 53 which may be removably coupled in any of the securement apertures 52. Preferably, the securement device 51A, 51B, may be stretched around portions of a bicycle 300 being supported by the device 100 and another element of the device 100 and while stretched, the securement fastener 53 may be positioned in a securement aperture 52 which may maintain the securement device 51A, 51B, in a stretched configuration thereby tensioning the bicycle 300 portions and elements of the device 100 together. By separating the securement fastener 53 from the securement aperture 52 the securement device 51A, 51B, may be released from around the bicycle 300 portions and elements of the device 100. For example, the device 100 may comprise a first securement device 51A which may be configured to removably tension portions of a bicycle 300 frame proximate to the crank and crank arms 301 and/or portions of the crank to portions of the crank receiver 31, 31A, 31B, support base 16, 16A, 16B, etc. As another example, the device 100 may comprise a second securement device 51B which may be coupled to a wheel support 36, 36A, 36B, and which may be configured to removably tension portions of a front bicycle tire 302 and wheel to a wheel support 36, 36A, 36B. Optionally, a wheel support 36, 36A, 36B, and/or other element of the device 100 may comprise a securement channel 54 which may provide a recess or depression in the wheel support 36, 36A, 36B, and/or other element of the device 100 for receiving portions of a securement device 51A, 51B, and/or for coupling portions of the securement device 51A, 51B, into or below the surface of the wheel support 36, 36A, 36B, and/or other element of the device 100.

While some exemplary shapes and sizes have been provided for elements of the device 100, it should be understood to one of ordinary skill in the art that the receiver coupler 11, mounting plate 12, support base 15, crank receiver 31, 31A, 31B, lateral support 35, 35A, 35B, wheel support 36, 36A, 36B, and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or may comprise durable and slightly flexible materials such as soft plastics, silicone, soft rubbers, or any other suitable materials including combinations of materials. In some embodiments, one or more of the elements that comprise the device 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the device 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, a slide-to-lock type connection method or any other suitable temporary connection method as one reasonably skilled in the art could envision to serve the same function. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A modular securement device for securing a bicycle to a vehicle, the bicycle having a crank arm and a pedal coupled to the crank arm, and the device comprising:

a crank receiver having a crank cavity and a vertical groove, wherein the crank cavity is configured to receive the crank arm of the bicycle so that the crank arm is inserted into the crank cavity, wherein a portion of the pedal that is coupled to the crank arm extends through the vertical groove and is positioned outside of the crank cavity;

a lateral support;

a wheel support coupled to the lateral support, the lateral support configured to separate the wheel support from the crank receiver, and the wheel support configured to immobilize a front tire of the bicycle that has its crank arm received in the crank receiver; and a mounting plate coupled to the crank receiver, wherein the mounting plate comprises a first mounting surface, a second mounting surface, and a central longitudinal axis, wherein the first mounting surface and the second mounting surface are positioned on opposite sides of the central longitudinal axis, wherein the first mounting surface is angled between approximately 0.1 to 30 degrees below the central longitudinal axis, wherein the second mounting surface is angled between approximately 0.1 to 30 degrees below the central longitudinal axis, and wherein the crank receiver is coupled to the first mounting surface so that the angle of the first mounting surface is imparted to the lateral support, to the wheel support, and to the crank receiver.

2. The device of claim 1, further comprising a receiver coupler configured to be removably coupled to the vehicle.

3. The device of claim 1, wherein the mounting plate and crank receiver are removably coupled together via a support base, wherein the mounting plate comprises a slot that extends longitudinally along the first mounting surface, and wherein the support base is movably coupled to the slot and to the first mounting surface so that the support base is configured to be positioned and repositioned at various locations on the mounting plate along the slot.

4. The device of claim 1, wherein the crank receiver and lateral support are coupled together.

5. The device of claim 4, wherein the crank receiver and lateral support are integrally formed together.

6. The device of claim 1, further comprising a securement device that is coupled to the wheel support.

7. The device of claim 1, wherein the wheel support is repositionably coupled to the lateral support.

8. The device of claim 1, wherein the wheel support comprises a tire channel for receiving a portion of a tire of the bicycle.

9. The device of claim 8, wherein the wheel support is movable between a first position, in which the tire channel is positioned relatively closer to the lateral support, and a second position, in which the tire channel is positioned relatively farther from the lateral support.

10. The device of claim 1, further comprising a support base, wherein the crank receiver and lateral support are coupled to the receiver coupler via the support base.

11. The device of claim 10, wherein the support base comprises a base receiver, wherein the base receiver comprises a base cavity, and wherein the receiver coupler is received in the base cavity.

12. The device of claim 11, wherein the base receiver is repositionably coupled to the receiver coupler.

13. A modular securement device for securing items to a vehicle, the device comprising:

a receiver coupler configured to be removably coupled to the vehicle;

a mounting plate coupled to the receiver coupler, wherein the mounting plate comprises a first mounting surface, a second mounting surface, and a central longitudinal axis, wherein the first mounting surface and the second mounting surface are positioned on opposite sides of the central longitudinal axis, wherein the first mounting surface is angled between approximately 0.1 to 30 degrees below the central longitudinal axis, and wherein the second mounting surface is angled between approximately 0.1 to 30 degrees below the central longitudinal axis;

a support base coupled to the first mounting surface of the mounting plate;

a crank receiver coupled to the support base, the crank receiver extending above the support base, and the crank receiver having a crank cavity and a vertical groove, wherein the crank cavity is configured to receive a crank arm of a bicycle so that the crank arm is inserted into the crank cavity, wherein a portion of a pedal that is coupled to the crank arm extends through the vertical groove and is positioned outside of the crank cavity;

a lateral support coupled to the support base;

a wheel support coupled to the lateral support, the lateral support configured to separate the wheel support from the crank receiver, and the wheel support configured to immobilize a front tire of the bicycle that has its crank arm received in the crank receiver; and wherein the support base is coupled to the first mounting surface so that the angle of the first mounting surface is imparted to the support base, to the lateral support, to the wheel support, and to the crank receiver.

14. The device of claim 13, wherein the receiver coupler and mounting plate are removably coupled together.

15. The device of claim 13, wherein the crank receiver and lateral support are coupled together.

16. The device of claim 13, wherein the wheel support comprises a tire channel for receiving a portion of a tire of the bicycle, and wherein the wheel support is movable between a first position, in which the tire channel is positioned relatively closer to the lateral support, and a second position, in which the tire channel is positioned relatively farther from the lateral support.

17. The device of claim 13, wherein the support base comprises a base receiver, wherein the base receiver comprises a base cavity, and wherein the receiver coupler is received in the base cavity.

18. The device of claim 13, wherein a portion of the receiver coupler comprises an elongated rectangular prism shape.

19. The device of claim 13, wherein the mounting plate comprises a slot that extends longitudinally along the first mounting surface, wherein the mounting plate comprises a lock cavity in communication with the slot, and wherein the support base is movably coupled to the slot and to the first mounting surface via base lock plate that is positioned in the lock cavity so that the support base is configured to be positioned and repositioned at various locations on the mounting plate along the slot.

* * * * *